United States Patent
Adogla

(10) Patent No.: US 12,547,752 B2
(45) Date of Patent: Feb. 10, 2026

(54) SOVEREIGN DATA CENTER INCOMING DATA MANAGEMENT

(71) Applicant: Oracle International Corporation, Redwood Shores, CA (US)

(72) Inventor: Eden Grail Adogla, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 157 days.

(21) Appl. No.: 18/654,448

(22) Filed: May 3, 2024

(65) Prior Publication Data

US 2024/0386124 A1 Nov. 21, 2024

Related U.S. Application Data

(60) Provisional application No. 63/466,599, filed on May 15, 2023.

(51) Int. Cl.
*H04L 29/06* (2006.01)
*G06F 21/62* (2013.01)

(52) U.S. Cl.
CPC ...... *G06F 21/6218* (2013.01); *G06F 21/6236* (2013.01); *G06F 2221/2111* (2013.01); *G06F 2221/2147* (2013.01)

(58) Field of Classification Search
CPC .................................................. G06F 21/6218
See application file for complete search history.

(56) References Cited

U.S. PATENT DOCUMENTS

| | | |
|---|---|---|
| 8,640,189 B1 | 1/2014 | Ernst et al. |
| 11,954,220 B2 * | 4/2024 | Ekins ............. G06F 21/604 |
| 12,210,640 B1 | 1/2025 | Bin et al. |

(Continued)

FOREIGN PATENT DOCUMENTS

| | | | |
|---|---|---|---|
| EP | 2710507 A1 | 3/2014 | |
| WO | WO-2012160366 A1 * | 11/2012 | ......... H04L 63/1441 |

OTHER PUBLICATIONS

International Patent Application No. PCT/US2024/029088, "International Search Report and Written Opinion", Aug. 16, 2024, 15 pages.

(Continued)

*Primary Examiner* — Jason K Gee
(74) *Attorney, Agent, or Firm* — Kilpatrick Townsend & Stockton LLP

(57) ABSTRACT

Techniques are described for data management. An example method can include processing a first message indicating that an intermediate computing system managed by a data center in a first region has received data from a second data center in a second region, the data stored in an isolated environment of the intermediate computing system. The method can further include transmitting first control instructions to the intermediate computing system to validate the data based at least in part on a first criteria. The method can further include processing a second message indicating to release the data from the isolated environment of the intermediate computing system and processing a third message indicating that the second message originated from the first region. The method can further include causing the data to be released from the isolated environment based at least in part on the validation results.

20 Claims, 13 Drawing Sheets

(56) References Cited

U.S. PATENT DOCUMENTS

| | | |
|---|---|---|
| 2006/0190606 A1 | 8/2006 | Kohavi |
| 2012/0078643 A1* | 3/2012 | Nagpal .................. G06Q 30/02 |
| | | 707/812 |
| 2013/0067558 A1 | 3/2013 | Markham et al. |
| 2013/0212698 A1 | 8/2013 | Tarrago et al. |
| 2013/0312117 A1 | 11/2013 | Sapp et al. |
| 2014/0109178 A1 | 4/2014 | Barton et al. |
| 2016/0352769 A1 | 12/2016 | Bryant et al. |
| 2019/0386957 A1 | 12/2019 | Leon |
| 2019/0394024 A1 | 12/2019 | Vepa et al. |
| 2021/0029170 A1 | 1/2021 | Gupta et al. |
| 2021/0182607 A1 | 6/2021 | Agarwal |
| 2022/0060517 A1 | 2/2022 | Dozorets et al. |
| 2022/0108031 A1* | 4/2022 | Saini .................. G06F 21/6254 |
| 2022/0109560 A1 | 4/2022 | Dennison et al. |
| 2022/0159064 A1 | 5/2022 | Barton et al. |
| 2022/0255931 A1 | 8/2022 | Avetisov et al. |
| 2024/0020047 A1 | 1/2024 | Bert |

OTHER PUBLICATIONS

U.S. Appl. No. 18/654,267, "Non-Final Office Action", Sep. 10, 2025, 20 pages.

International Patent Application No. PCT/US2024/029088, "International Preliminary Report on Patentability", Nov. 27, 2025, 11 pages.

* cited by examiner

700

```
┌─────────────────────────────────────────────────────────────┐
│ Process, by a computing system of a first data center in a  │
│ first sovereign region, a first message indicating that an  │
│ intermediate computing system managed by the first data     │
│ center has received data from a second data center in a     │
│ second sovereign region, the data stored in an isolated     │
│ environment of the intermediate computing system 702        │
└─────────────────────────────────────────────────────────────┘
                              │
                              ▼
┌─────────────────────────────────────────────────────────────┐
│ Transmit, by the computing system, first control            │
│ instructions to the intermediate computing system to        │
│ validate the data based on a first criteria 704             │
└─────────────────────────────────────────────────────────────┘
                              │
                              ▼
┌─────────────────────────────────────────────────────────────┐
│ Process, by the computing system, validation results from   │
│ intermediate computing system 706                           │
└─────────────────────────────────────────────────────────────┘
                              │
                              ▼
┌─────────────────────────────────────────────────────────────┐
│ Process, by the computing system, a second message          │
│ indicating to release the data from the isolated            │
│ environment of the intermediate computing system 708        │
└─────────────────────────────────────────────────────────────┘
                              │
                              ▼
┌─────────────────────────────────────────────────────────────┐
│ Process, by the computing system, a third message           │
│ indicating that the second message originated from a        │
│ computing device located in the first sovereign region 710  │
└─────────────────────────────────────────────────────────────┘
                              │
                              ▼
┌─────────────────────────────────────────────────────────────┐
│ Cause, by the computing system, the data from the isolated  │
│ environment to be released, based at least in part on the   │
│ validation results, the indication to release the data, and │
│ the indication that the second message originated in the    │
│ first sovereign region 712                                  │
└─────────────────────────────────────────────────────────────┘
```

FIG. 7

SOVEREIGN DATA CENTER INCOMING DATA MANAGEMENT

CROSS-REFERENCES TO RELATED APPLICATIONS

This application claims the benefit of U.S. Provisional Application No. 63/466,599, filed on May 15, 2023, which is incorporated by reference in its entirety.

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others.

BRIEF SUMMARY

The present disclosure relates generally to validating data that is being received in a first sovereign jurisdiction from a second sovereign jurisdiction. More particularly, techniques are described for storing data received from a foreign jurisdiction in an isolated environment. The data can be validated while stored in the isolated environment. The validated data can be approved to pass from the isolated environment and into a data center at the first sovereign jurisdiction. Various embodiments are described herein, including computer-implemented methods, systems, non-transitory computer-readable media storing programs, code, or instructions executable by one or more processors, and the like. Some embodiments may be implemented by using a computer program product, comprising program/instructions which, when executed by a processor, cause the processor to perform any of the methods described in the disclosure.

One computer-implemented method can includes processing, by a computing system of a first data center in a first sovereign region, a first message indicating that an intermediate computing system managed by the data center has received data from a second data center in a second sovereign region. The data can be stored in an isolated environment of the intermediate computing system.

The computer-implemented method can further include transmitting, by the computing system, first control instructions to the intermediate computing system to validate the data based on a first criteria.

The computer-implemented method can further include processing, by the computing system, validation results from the intermediate computing system.

The computer-implemented method can further include processing, by the computing system, a second message indicating to release the data from the isolated environment of the intermediate computing system.

The computer-implemented method can further include processing, by the computing system, a third message indicating that the second message originated from a computing device located in the first sovereign region.

The computer-implemented method can further include causing, by the computing system, the data to be released from the isolated environment, based at least in part on the validation results, the indication to release the data, and the indication that the second message originated in the first sovereign region.

BRIEF DESCRIPTION OF THE DRAWINGS

FIG. 7 is an example process flow for data validation, according to one or more embodiments.

DETAILED DESCRIPTION

Figure 1:
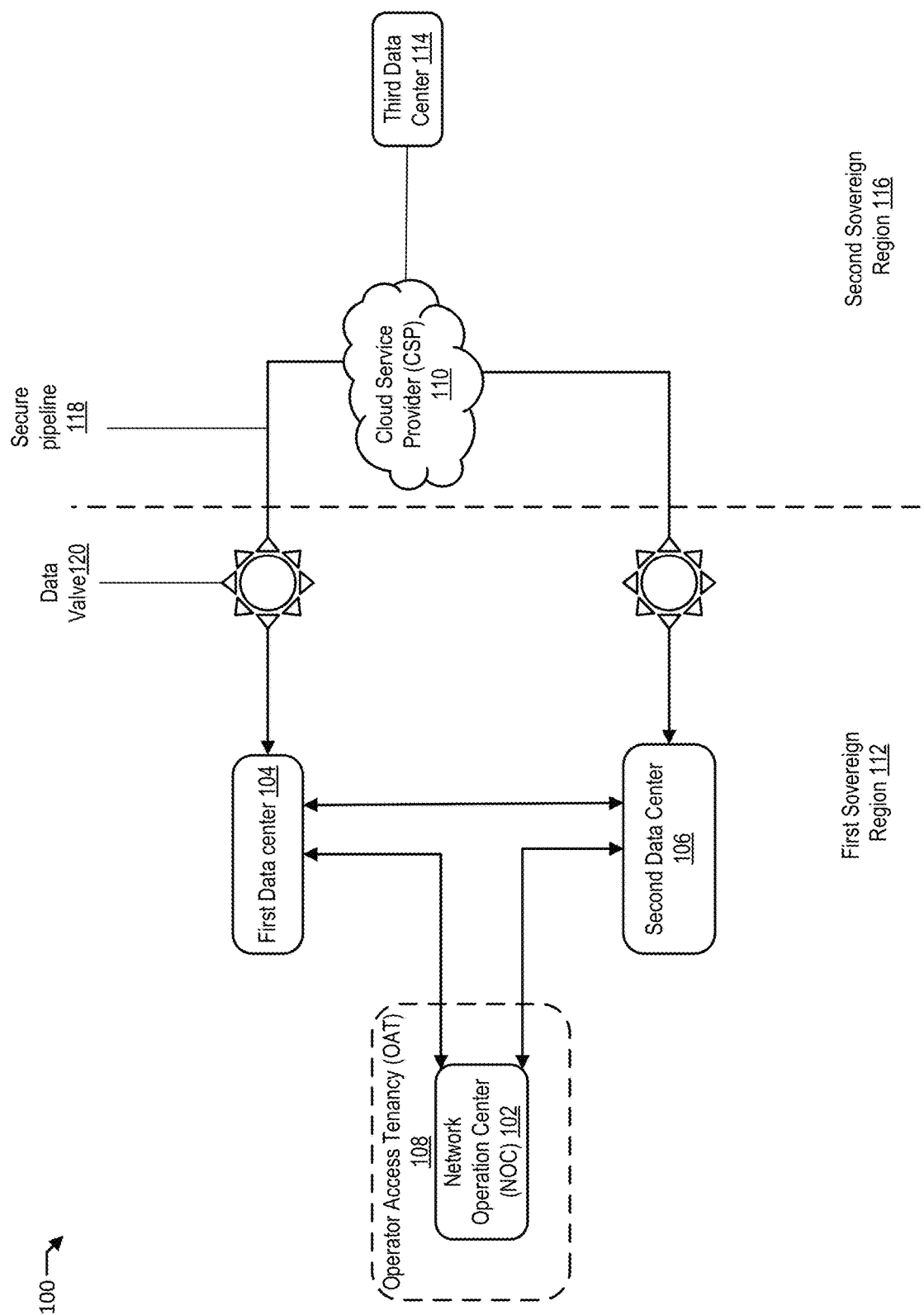
FIG. 1 is an illustration of an example data validation system, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

An entity may control more than one data center and wish to transmit or receive data from a data center in one region to a data center in another region. For example, an entity (e.g., a cloud services provider) may have a data center in a first region (e.g., the United States) and desire to transmit data to another data center in a second region (e.g., Europe). One issue that can arise is that the protocols applicable to a data center receiving the data can be different than the protocols for transmitting the data. For example, the security protocols at the receiving data center can be different than the security protocols at the transmitting data center. This can create issues as to whether the data should be received by the receiving data center.

The embodiments herein describe a secure pipeline for transmitting data from one data center to another data center across a sovereign boundary. A secure pipeline for the enhanced regulation of data flow can be established between two data centers that may be operated by the same cloud services provider. The secure pipeline can include a data valve arranged at an intermediate point between the two data centers. The data valve can mediate the flow of data of a predetermined format and schema, in a specific direction, and stipulate the validation rules that must be applied to any data payload to determine if the payload is to be allowed to pass through or not. The data valve can log all payloads and their processing outcomes. Such logs may be fed into a security and information event management (SIEM) system for further processing and auditing.

The data valve can include software, hardware, or a combination thereof for validating the data. For example, in some instances, the data valve can be a bare metal server, and in other instances, the data valve can be a network interface controller (NIC) that controls traffic to and from a host. The validation performed by the data valve can include reviewing any changes to the data, including manual changes, automated changes, or semi-automated changes. The validation can include validating any change signatures to determine whether the signature corresponds to a person that is authorized to make the changes. The validation can include checking the data for malware. The malware detection can be performed without or without the assistance of a machine learning model. The validation can include a hermitic rebuild from a source. For example, rather than accept an object, the receiving data center can request instructions for building the object. The object can be rebuilt using, for example, any necessary libraries, code, or other data at the data valve. This process can include the receiving data center building the object in a secure environment (e.g., a hermetic environment) at the data valve, in which the data cannot interact with other data outside of the secure environment. The validation can further include a hermetic rebuild from a source. The validation can further include a hermetic rebuild using an alternate dependency. The receiving data center can determine whether the data transmitted by the transmitting data center is valid or invalid based on the above-described validation processes.

The data can pass through the data valve and reach the receiving data center, and be stored in a staging area. The staging area can be a secure area that partitions the data away from the rest of the receiving data center. The staging area can include software, hardware, or a combination thereof for validating the data and partitioning the data away from the rest of the receiving data center. The staging area can be used to perform validations in addition to any validations performed at the data valve to validate the data. The receiving data center can determine whether to allow the data out of the staging area and into the receiving data center.

FIG. 1 is an illustration 100 of an example data validation system, according to one or more embodiments. A network operation center (NOC) 102 can be in communication with a first data center 104 and a second data center 106. The NOC 102 can be one or more virtual or physical interfaces of a data center for operating various data center systems. For example, the NOC 102 can be a computer in a designated room inside either the first data center 104 or second data center 106, or the NOC 102 can be a computer used by authorized personnel to operate the various data center systems. In other words, the NOC 102 can be computing device, such as a laptop that is located outside of the first data center 104 and second data center 106.

The NOC 102 can be restricted to use by an operating access tenancy (OAT) 108, which can be the personnel that are authorized to use the NOC 102 to operate the various data center systems. In some instances, the personnel are residents of the same region as the data center. For example, if the data center is located in India, the personnel are also residents of India and are physically present within the same region as the data center. The NOC 102 can include one or more security mechanisms to restrict use of the NOC to the OAT 108. For example, access to using the NOC 102 can be protected by passcode, biometrics, or other appropriate security measure. In other instances, access to the NOC 102 can be protected by additional security measures, such as storing the NOC 102 in a secure room that requires permission from security personal and/or passcode, biometrics, or other appropriate security measure to enter the room. In any event the access to the NOC 102 can be restricted to the OAT 108.

The first data center 104 and the second data center 106 can be part of a network of data centers operated by a cloud services provider (CSP) 110. The network of data centers can be arranged by regions, in which each region can include one or more data centers. Each data center in a region can include a physically distinct infrastructure, including servers, computing systems, internal networking systems, internal climate control systems, and internal power systems. Therefore, if there is a failure or expected failure at one data center, the fault is unlikely to affect another data center based each data center being physically distinct and having individual internal systems. The data centers (e.g., the first data center 106 and the second data center 108) within a region can be connected via a low-latency high bandwidth network. Therefore, even if there is a fault or expected fault at one data center, the other data centers in a region can continue to provide services to the CSP's customers.

Each data center can manage data on behalf of the CSP's customers and vendors, which includes any data provided by a CSP customer or vendor and any data or metadata derived from the customer or vendor interacting with a cloud service. This data and metadata can include, for example, data provided by the customer, customer identities, compute names, IP addresses, data addresses, metrics, usage data, and other data.

The data stored at a data center can be subject the legal requirements of the sovereign region, in which the data center is located. For example, the data can be subject to different privacy regulations depending on which sovereignty the data center is located. Data stored in California can be subject to the California Consumer Privacy Act (CCPA) and data stored in European Union can be subject to the General Data Protection Regulation (GDPR). Although each of the CCPA and the GDPR may have some overlapping requirements, distinctions in other requirements between the CCPA and GDPR can create a need to manage data stored in California differently than data stored in Europe. It should be appreciated that data privacy is only one example of a legal area in which different sovereign regions can impose different legal requirements on the data.

As illustrated, the first data center 104 and the second data center 106 can be located in the same first sovereign region 112. In this scenario, the data stored at the first data center 104 and the data stored at the second data center 106 can be subject to the same legal requirements. In some other instances, a data center in one sovereign region may desire to transfer data in another sovereign region. In these instances, a difference in the legal requirements of one jurisdiction and another jurisdiction can be considered prior to transferring the data from one data center to another data center.

For example, a CSP 110 can operate a first data center 104 and a second data center 106, which are both located in the first sovereign region 112. The CSP 110 can further operate a third data center 114 in a second sovereign region 116. If the CSP 110 wants to transmit data to the first data center 104 from the third data center 114, the CSP 110 may need to consider whether a payload from a third data center 114 is compliant with the legal requirements of the first sovereign region 112.

The NOC 102 can be used to manage the data being received or transmitted from a first data center 104 over secure pipeline 118. In some embodiments, the secure pipeline 118 can be unidirectional. In other words, the CSP 110 can transmit data from one or more data centers to the first data center 104 over the secure pipeline 118. However, the first data center 104 cannot receive data from the one or more data centers over the secure pipeline 118. In other embodiments, the secure pipeline 118 can be a bidirectional pipeline, in which the first data center 104 and the one or more data centers can transmit data centers to each other over the secure pipeline 118.

The secure pipeline 118 can include a data valve 120 at an intermediate point between the first data center 104 and the third data center 114. In some embodiments the data valve 120 can be located within the borders of the first sovereign region 112. For example, if the first sovereign region 112 is France, then the first data center 104 and the data valve 120 are both located in France. The data valve 120 can include software, hardware, or a combination thereof to be used to temporally store data transmitted from a data center (e.g., the third data center). Data that is stored at the data valve 120 can be isolated and inaccessible by users at the third data center 114 and the first data center 104.

The data transmitted from the third data center 114 can be intercepted by a data valve 120. The data valve 140 can transmit a message to the NOC 102 that data has been received via the secure pipeline 118. The NOC 102 can transmit a response that includes control instructions for the data valve 120 to isolate the data, make the data inaccessible to the third data center 114, and validate the data received from the third data center 114.

The data valve 120 can validate the data pursuant to control instructions with includes the requirements for validation. Each sovereign region can implement its own requirements for data validation. The data valve 120 can validate the data pursuant to the sovereign region's requirements. As the data is neither at the third data center 114 nor the first data center 102, the data valve can replicate the data and have the flexibility to perform various operations to validate without interference from the third data center 114. The results of the validation can be transmitted to NOC 102. The results can include, for example, a description of any change, checksums, and other relevant data.

As indicated above, the NOC 102 can be used by personnel that include one or more persons that are authorized to operate one or more systems of each of the first data center 104 and the second data center 106. In addition to being authorized to operate the one or more systems, the personnel can meet additional temporal conditions to authorize the data valve to release the data. The personnel can be required to be physically present in the sovereign region in which the data center is located. For example, the personnel can be required to be located in the first sovereign region 112. Another requirement can be that the personnel are residents of the sovereign region in which the data center is located. Again, as illustrated the personnel can be required to be residents of the first sovereign region 112.

The NOC 102 can be in communication with a human resources system at the first data center 104. The human resources system can include employee data indicating which employees are currently employed by the CSP 110 and authorized to use the NOC 102. A user can be required to enter a passcode, use a multi-factor authentication, or submit biometric information to prove the user's identity. In response to validating the user's identity and authorization to use the NOC 102, the first data center computing system can access the human resource system to verify that the user is a resident of the first sovereign region 112. The first data center computing system can further determine whether the user is physically located in the first sovereign region. For example, if the NOC 102 is a laptop, then it is possible that the user has taken their laptop out of the first sovereign region 112. The first data center computing system can use various to determine whether the user is physically located in the first sovereign region 112. For example, the first data center computing system can determine whether the NOC 102 is connected to a local network. In another example, the first data center computing system can access a location service (e.g., a global positioning system service) to determine the location of the NOC 102. If the user entered a passcode, used a multi-factor authentication, or submitted biometric information into the NOC 102 and the NOC 102 is located within the first sovereign region 112, it can be inferred that the user is also in the first sovereign region 112.

In the event that the NOC 102 validates the user's identity, authorization level, and location, the NOC 102 can permit the user to determine whether to permit the data valve 120 to release the data. The user, with assistance from the first data center's computing system, can review the data and the validation results and determine whether or not to permit the data valve 120 to release the data. In the event the user elects not to permit the data valve 120 to release the data, the data valve can process the data. For example, the data valve 120 can delete the data, any replications of the data, and any transformation of the data. The first data center's computing system can further transmit a message to the third data center 114 indicating that the data was not permitted to enter the first data center 104.

In the event the user permits the data valve 120 to release the data, the data can be received at a staging area. The first data center 104 can store the data at a staging area, which can be an isolated environment of the first data center 104, similar to the data valve 120. The data can undergo a second validation while in the staging area. One or more validation processes, as described above, can be performed at the staging area. Additional processes can further be performed to validate the data at the staging area. In some instances, the staging area can have different capabilities than the data valve 120. For example, the staging area can have a greater number of capabilities than the data valve 120. In these instances, the staging area may be able to validate additional requirements of a sovereign region than the data valve 120. The staging area can further transmit the validation results to the NOC 102.

Based on the validation performed at the staging area, the personnel using the NOC 102 can make a determination to release the data from the staging area and into the first data center 104. If the same NOC 102 used to release the data from the data valve 120, the user may or may not be required to revalidate identity, authorization level, location, and residency. If, however, another NOC 102 is used to release the data from the staging are, the user can be asked to validate identity, authorization level, location, and residency.

In some embodiments, the data from a data center (e.g., the third data center 114) can be validated at the data valve 120 and the staging area. In some other embodiments, the secure pipeline 118, the data valve 120 is included in the staging area, such that the data is a validated at the staging area by the data valve 120.

Once the data is released from the staging area, the data can be transformed for storage at the first data center 104. It should be appreciated that the data is transmitted in from the data valve 120 in the same format that the data was received by the data valve 120. In other words, the data is transmitted from the data valve in the format that the data was transmitted from the third data center 114. For example, the data can be organized as raw data, metadata, and summary data in format compatible with the first data center 104. The data can then be stored at the first data center 104 and made available for users.

Figure 2:
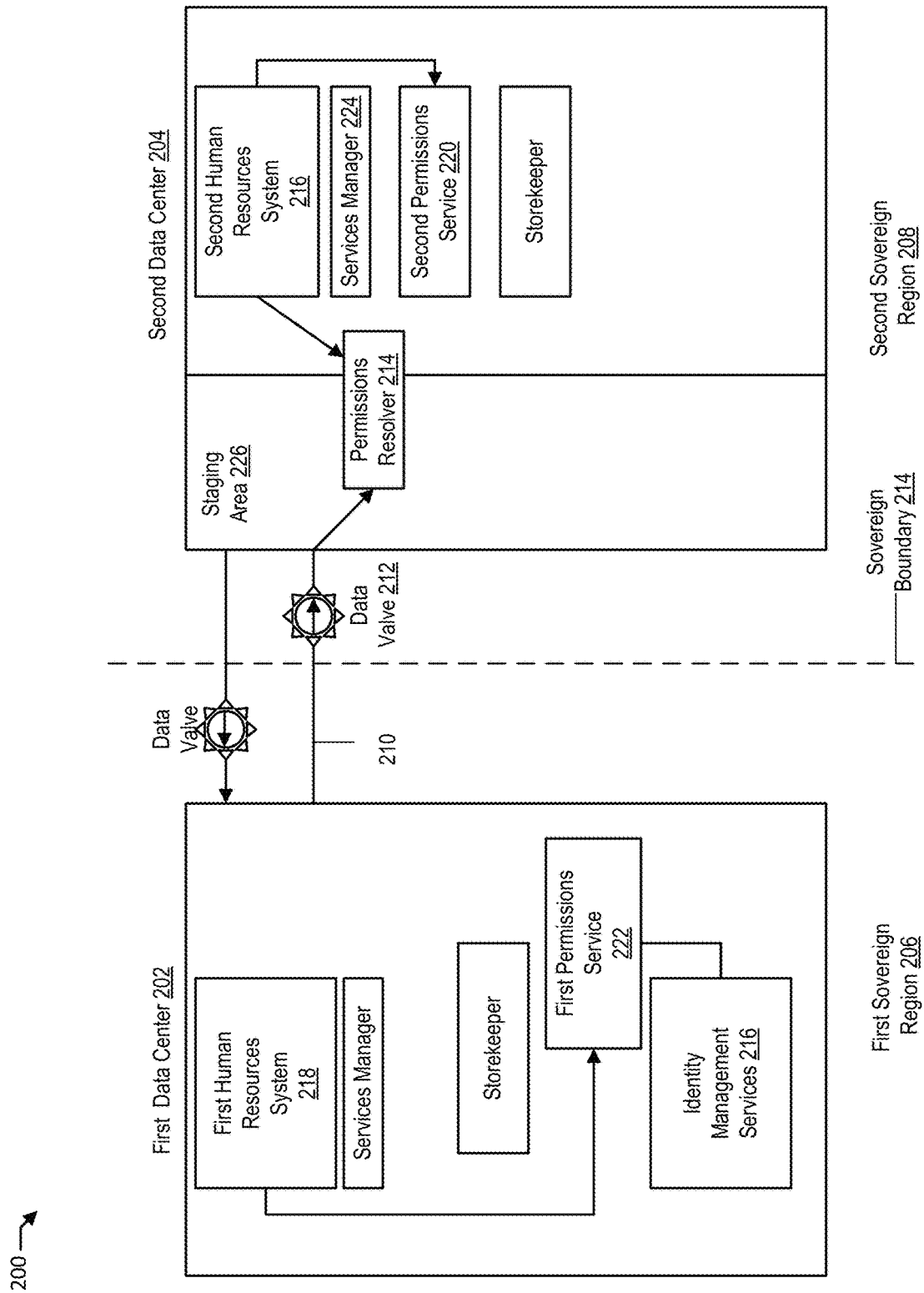
FIG. 2 is an illustration of an example data validation system, according to one or more embodiments.

FIG. 2 is an illustration of an example data validation system, according to one or more embodiments. A first data center 202 and a second data center 204 can be part of a network of data centers that are operated by the same CSP. The first data center 202 can be located in a first sovereign region 206 (e.g., United States) and the second data center 204 can be located in a second sovereign region 208 (e.g., Spain). The first data center 202 and the second data center 204 can further perform the functionality described herein using an infrastructure and computing system as described with respect to FIGS. 9-13.

The first data center 202 can transmit data to the second data center 204 over secure pipeline 210. The secure pipeline 210 can include one or more security measures to present unauthorized access to data transmitted over the pipeline. For example, the data transmitted across the secure pipeline 210 can be encrypted at the first data center 202 and decrypted at the second data center 204.

The secure pipeline 210 can include a data valve 212 arranged at an intermediate point between the first data center 202 and the second data center 204 and in the second sovereign region 208. For example, the data valve 212 can be located within a sovereign boundary 228 of the second sovereign region 208. The data valve 212 can include a combination of hardware (e.g., a server or a network interface controller) and software used to regulate data in a unidirectional path from the one or more data centers (including the first data center 202) to the second data center 204. The data valve 212 can further create an isolated environment, in which data that has been intercepted at the data valve 212 cannot be accessed by the first data center 202 or the second data center 204 until the data valve 212 releases the data. In the instance that the data valve 212 intercepts data routed to the second data center 204, the data valve 212 can store the data in an isolated environment and implement access controls that prevent both the first data center 202 and the second data center 204 from accessing the data. The data can be stored in the format (e.g., JSON) as provided by the first data center 202. Once the data has been isolated, the data valve 212 can transmit a message to the second data center 204 indicating that data transmitted through the secure pipeline 210 has been received at the data valve 212. For example, the second data center 204 can include a NOC for operating one or more systems of the second data center 204 that can receive the message. The message can include an indication of the characteristics of the received data. For example, the message can indicate data structure types, data classes, and other appropriate data categories. The NOC can transmit a response message with instructions to validate the data. In some instances, the message can include using particular validation techniques for particular data categories. In other instances, the data valve 212 can be configured to select particular validation techniques based on the data category or sovereign requirements. The data valve 212 can validate the data and transmit the validation results to the NOC.

The user operating the NOC can determine whether to permit the data to be released from the data valve 212 based on the validation results. For example, the user can view the validation results and enter input indicating whether or not the data is to be released from the data valve 212. However, prior to executing a command permitting or denying release of the data from the data valve 212, the NOC can determine whether the user meets the requirements to make the determination. The NOC can access an identification associated with the user. For example, the NOC may be assigned to the user, the user may have inputted a user identifier or user password, or the NOC can use biometric data, such as facial features, to identify the user. The NOC can transmit the user's identity to a permissions resolver 214 along with instructions to determine whether the user meets the requirements to determine whether to permit the data to be released from the data valve 212.

The permission resolver 214 can include software for applying a set of rules and determining whether the user meets the requirements to make the determination. The requirements can include whether the user is currently an employee of the CSP, whether the user has a permission level to make the determination whether to permit or deny the release of data from the data valve 212, whether the user is a resident of the second sovereign region whether the user is currently located in the second sovereign region.

The permissions resolver can access a second human resources system 216 for the second sovereign region 208. The second human resources system 216 can include employee information for employees working in the second sovereign region. For example, the second human resources system can include employee information for each employee working in each data center in the second sovereign region 208. The employee information stored at the second human resources system 216 can include personally identifiable information, such as name, employee identifier, address, and residency. In some instances, the second human resources system 216 can include a subset of the employees working for the CSP. The CSP can include a global human resources system that includes employee information for all employees of the CSP. For example, in some instances, the first sovereign region 206 can be a headquarters of the CSP and include a first human resource system 218 that is a global human resources system. In other instances, the global human resources system can be located in another data center than the data center transmitting the data to the second data center 204. In any event, the permissions resolver 214 can be configured to determine employee information from a local human resources system, rather than accessing employee information from the global human resources system.

The permissions resolver 214 can transmit the employee identifier to the second human resources system 216 along with instructions to verify that the user currently works for the CSP, a permission level of the user, and a residency of the user. The second human resources system 216 can access an employee database and access the user's file based on the received employee identifier. The second human resources system 216 can further determine whether the user is currently an employee of the CSP and is assigned to the second data center 204. In other words, the permissions resolver 214 can locally resolve whether the user currently works for the CSP, is assigned to the second data center 204 and is a resident of the second sovereign region 208.

In some embodiments, the second human resources system 216 can further access the global human resources system (e.g., the first human resource system 218) and reverify that the user currently works for the CSP, is assigned to the second data center 204 and is a resident of the second sovereign region 208. In some instances, it may be possible that the global human resources system has been updated with changes to the user's employment status, location assignment, and residency; and the global human resources system has not pushed out updates to a local human resources system (e.g., second human resources system 216).

The second human resources system 216 can further determine whether the user has permission to authorize release of the data. The second human resources system 216 can further access a second permissions service 220, that is configured to manage employee access rights to prevent employees from engaging in unauthorized activities on the CSP's computing systems. The second permissions service 220 can include information for managing roles, permissions, and access control rules for employees assigned to the second data center 204. For example, the CSP can assign permissions to employees based on pre-defined rules. The permissions can include whether the use can permit or deny the data to be released from the data valve 212.

The second human resources system 216 can transmit message to the second permissions service 220 providing an identity of the user and a request for information as to whether the user has permission to determine whether to permit the data to be released from the data valve 212. In response to receiving the identity and the request, the second permissions service 220 can determine whether the has the requisite permission. For example, the user can be part of a group that the CSP has designated to have permission to determine whether to release data from the data valve. The second human resources system 216 can check the group to verify the user's status as a member of the group.

In some embodiments, the second human resources system 216 can further access a global human resources system (e.g., the first human resources system 218) and transmit the user's identify and a request to validate the user's permission level. The global human resources system can access a global permission service. For example, a first permission services 222 of the first data center 202 can be a global permissions service. The first permission service 222 can access its records and determine whether to user has the requisite permission level. Similar to the human resource's systems, it may be possible that the global permissions service has been updated with changes to the user's permission level; and the global permissions service has not pushed out updates to a local permissions service (e.g., second permissions service 220).

The permissions resolver 214 can further determine whether the user is located in the second sovereign region 208. In order to do so, the permissions resolver 214 can determine whether the NOC is located in the second sovereign region 208. If the NOC is in the second sovereign region 208, then the permissions resolver 214 can infer that the user is also in the second sovereign region 208. The permissions resolver 214 can use various methods to determine whether the NOC is in the second sovereign region 208. The permissions resolver 214 can determine that the NOC is physically located within the second data center 204. For example, the permissions resolver 214 can access a mainframe in the second data center 204 and determine that the NOC is using a wired communication interface to communicate with the mainframe. The permissions resolver 214 can further infer the user's presence in the second sovereign region 208 based on a wired communication with the mainframe. In another example, the permissions resolver can access a local area network (LAN), such as a Wi-Fi network, of the second data center 204 and communicate with the NOC using a wireless interface. Based on the communication, the permissions resolver can determine that the NOC is connected to the LAN. The permissions resolver 214 can further determine that the NOC is located within the second sovereign region 208 based on the NOC being connected to the LAN.

In yet another example, the NOC can be equipped with circuitry for accessing a location service, such as a global positioning system (GPS) service. The permissions resolver 214 can transmit a message to the NOC via the wired interface or the wireless interface to provide a location of the NOC via the location service. If the NOC provides a location that within the second sovereign region 208, the permissions resolver 214 can determine that the NOC is located in the second sovereign region 208. If the permissions resolver 214 determines that the NOC is in the second sovereign region 208, then the permissions resolver 214 can further determine that the user is in the second sovereign region 208.

However, sometimes the permissions resolver 214 may initially determine that the NOC is not located within the second sovereign region 208. For example, if the NOC is not communicating with the main frame over a wired connection or the NOC is not connected to a LAN, then the permissions resolver may transmit a message to the NOC requesting the NOC's location via a location service. If the NOC is able to provide a location within the second sovereign region 208, then the NOC can determine that the NOC is in the second sovereign region 208. If the NOC is unable to provide a location that is within the second sovereign region 208, then the permissions resolver 214 can determine that the NOC is not within the second sovereign region 208.

The permissions resolver 214 can use one or more of the above described methods to determine whether the NOC and by inference the user is located in the second sovereign region 208. It should be appreciated that the permissions resolver 214 can further use the method in various sequences. For example, above it is indicated that if the permissions resolver 214 determines that if the NOC is not connected to the mainframe via a wired interface or connected to a LAN via a wireless interface, then the permissions resolver 214 can transmit a request to the NOC for location information from a location service. In another instance, the permissions resolver 214 can transmit a request to the NOC for location information from a location service. Then, if the NOC is unable to provide location information indicating that the NOC is in the second sovereign region 208, the permissions resolver 214 can determine whether the NOC is connected to the mainframe via a wired interface or connected to a LAN via a wireless interface.

The user can be required to meet all of the requirements in order for the user's determination of whether the data is to be released from the data valve 212 is to be executed. Therefore, in order for the user's decision to either permit or deny the data from being released from the data valve 212, the user can be required to currently work for the CSP, be assigned to the second data center 204, be a resident of the second sovereign region 208, and be assigned the permission level to make the determination.

If the user decides to deny the data from being released from the data valve 212, then the data, and any permutations (e.g., copies, transformations) thereof can be deleted. If, however, the user determines to release the data from the data valve 212, the data can be received at a staging area.

After passing through the data valve 212, the data can be received at a staging area 226 of the second data center 204.

The staging area 226 can be an intermediate storage area that can be used by the second data center for data processing. Similar to the data valve 212, the staging area 226 can provide an isolated environment for validating the data prior to being reformatted and introduced into a data storage of the second data center 204. The staging area 226 can include a storage device of a network interface controller or a storage bare metal server. In addition, one or more validation processes, as described above, can be performed at the staging area 226.

The data can be received by the staging area 226 in the same format as transmitted by the data valve 212. Furthermore, the data can be received by the staging area 226 in the same format as transmitted by the first data center 202. While the data 208 is stored in the staging area 226, the second data center 204 can instruct the staging area 226 to perform one or more validation operations. For example, upon receiving the data in the staging area 226, a permissions resolver 214 can notify a NOC that data has been received at the staging area. The permissions resolver 214 can further verify that the data is inaccessible to any party including the first data center 202, the data valve 212 or any system of the second data center 204 outside of the staging area systems. The NOC can transmit a response message to perform one or more validation processes on the data and to report the results back to the NOC. In some instances, the NOC can transmit instructions for specific validation processes to be performed, and in other instances the NOC can transmit instructions to select validation processes based on the nature of the data. The permissions resolver 214 can transmit control instructions to the staging area 226 to perform one or more validation processes based on the instructions from the NOC.

The staging area 226 can permit the data to be validated in a single location, rather than distributing the data to be validated by different processes throughout the second data center 204. The validation can be performed in a single area and the results can be transmitted to a NOC and include each of the validation processes. In this sense, the one or more validation process are not omitted from a final validation testing report as the staging area can be aware of each validation process being performed. Furthermore, if the data does include a virus, malware, or other code that can be harmful to the second data center 204, including any stored data, the isolated environment of the staging area 226 prevents the harmful data from interacting with any data stored at the second data center 204.

The staging area 226 can perform one or more validation process on the data based on the instructions from the permissions resolver 214. Examples of the one or more processes are described with more particularity with respect to FIG. 4. The staging area 226 can further transmit the validation results to the permissions resolver 214. The permissions resolver 214 can transmit the validation results to the NOC. The NOC can transmit a response message indicating whether data can be release from the staging area or not.

As illustrated, the data valve 212 and the staging area 226 are indicated as separate points, in which a validation can be performed. It should be appreciated that in some instances, rather than having both the data valve 212 and a separate staging area 226, the secure pipeline 210 from the first data center 202 to the second data center 204 can include one of a data valve 206 or a staging area 226. For example, if there is a data valve 212, there is no staging area 226. Alternatively, if there is a staging area 226, there is no data valve 212.

In the event that the data is released from the staging area, the deployment of the data to the intended destination in the second data center 204 can be managed by a services manager 224.

Figure 3:
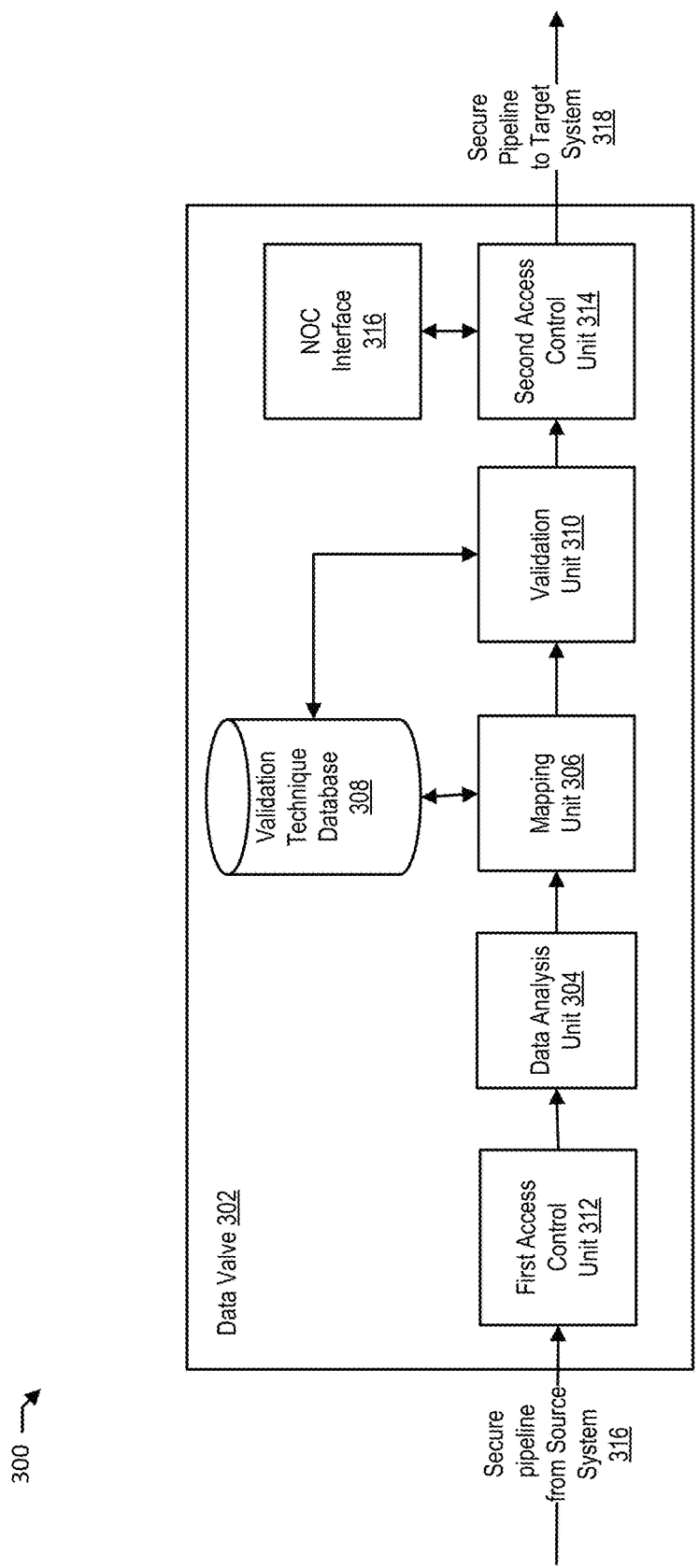
FIG. 3 is an illustration of an example data valve, according to one or more embodiments.

FIG. 3 is an illustration 300 of an example data valve, according to one or more embodiments. The data valve 302 can include a data analysis unit 304, a mapping unit 306, a validation technique database 308, and a validation unit 310. The data valve 302 can be gated from an external environment via a first access control unit 312 and a second access control unit 314. The first access control unit 312 can include a combination of software and hardware configured to manage data to and from the data valve 302. The first access control unit 312 can permit data transmitted over a secure pipeline 316 (e.g., secure pipeline 210) to pass through into the data valve 302. The data can be transmitted by, for example, a first data center (e.g., the first data center 202).

The first access control unit 312 can regulate the flow of data, such that data from the secure pipeline from the source system 316 can pass through into the data valve 302, where the source system can be the first data center. However, the data from the data valve 302 cannot pass back through to the secure pipeline from the source system 316 from the first access control unit 312. For example, the first access control unit 312 can be implemented by a network interface card (NIC) that is configured to receive data from a source system (e.g., first data center 202) via a secure pipeline from source system 316, and further to not allow data to be transmitted back to the source. For example, the NIC can be configured to filter communication, such that the communication can only flow in one direction. For example, the NIC can be configured to read a header associated with data packet received with the secure pipeline from source system 316. The NIC can further determine the source address (e.g., internet protocol (IP) address, medium access control (MAC) address) of a source system that transmitted the data packet based on the header. The NIC can further determine the target address (e.g., IP address, MAC address) for the data packet based on the header. The NIC can be configured to only permit data packets through that are received from a particular source system, and destined for a particular target system. For example, a first NIC can be configured to only allow data packets that are received from the first data center 202 and are to be transmitted to the second data center 204. A second NIC can be configured to only allow data packets that received from the second data center 204 and are to be transmitted to the first data center 202.

In other embodiments, the first access control unit 312 can include optical circuitry that is configured to receive an optical signal from a source. For example, the secure pipeline from source system 316 can include optical fibers for transmitting an optical signal to the first access control unit 312. In these embodiments, the first access control unit 312 can include an optical receiver that includes a photodiode for receiving the optical signal via the optical fibers and converting the optical signal into an electrical signal. The first access control unit 312 can further include a convertor circuit for receiving the electrical signal from the photodetector and converting the current into a voltage signal. The first access control unit 312 can further include a filter (e.g., high-pass filter, low-pass filter, bandpass filter) for receiving the voltage signal and filtering out and noise. The first access control unit 312 can further include a driver for processing the signal to be amenable to downstream processing. In this embodiment, the first access control unit 312 may not include a light source, such as a laser. Therefore, the photodetector can collect optical signals from a source, and the first access control unit 312 may have no light source to transmit an optical signal back to source via the optical fibers.

The first access control unit 312 can further prevent an external source from accessing data stored in the data valve 302. For example, once the first data center 202 has transmitted the data to be received by the second data center 204, the first access control unit 312 can initialize a security mechanism, such as a firewall, to prevent the first data center 202 from accessing the data stored in the data valve 302, including adding new data, modifying data, or deleting data.

The data that passes through the first access control unit 312 can be received by the data analysis unit 304. The data analysis unit 304 can include software for analyzing the data to gather information to be used for validation purposes. The data analysis unit 304 can perform various functions such as gather information for providing visualization of the data, statistical analysis of the data, mining the data for patterns, and performing predictive analytics. The information can be used by the data analysis unit 304 for determining one or more validation processes to perform on the data. The data analysis unit 304 can gather information to provide a visualization (e.g., a histogram of data types, a graph of data relationships, a chart of metadata describing the data) to the user on the NOC. The data analysis unit 304 can use the information to determine whether to permit the data to one or more validation processes to perform on the data.

The data analysis unit 304 can perform a statistical analysis of the data such as descriptive statistics and inferential statistics. The statistics can be used by the data analysis unit 304 to determine patterns in the data. In some instances, the patterns can be indicative of data that is under a special class in the second sovereign region 208. For example, the statistical analysis can indicate that a data, such as personally identifiable information, is being mixed with another data another type of data. Furthermore, it may be prohibited in the second sovereign region 208 to receive this special class of data, such as data with the two types of data that are mixed. The statistical analysis can be used by the data analysis unit 304 to select one or more validation processes to perform on the data.

The data analysis unit 304 can further perform data mining to extract and discover patterns and relationships in the data. The data analysis unit 304 can be configured to discover patterns and relationships that are relevant to the second sovereign region 208. For example, one item of data can be associated with another item of data. Such as, a user's name can be associated with an account number, and the association can be unencrypted. This association may be permissible in the first sovereign region 206, but may be impermissible in the second sovereign region 208. The data analysis unit 304 can further use predictive modeling to generative predictive analytics. For example, the data analysis unit 304 can make predictions as to an outcome of a data transformation process included in the data. Furthermore, the data transformation can alter data in a manner that is prohibited in the second sovereign region 208, such as certain alterations of financial information. The patterns and the relationships can further provide information that can be used by the data analysis unit 304 to select the one or more validation processes.

The data analysis unit 304 can use the information obtained from analyzing the data to determine a particular validation process to be used to validate the data received from the source system. The data analysis unit 304 can use various criteria to determine which validation technique(s) to use. The data analysis unit 304 can base the decision on the types of data. For example, if the data is numeric data, the data analysis unit 304 can determine to use a range validation. The data analysis unit 304 can determine a validation technique based on the regulations of the jurisdiction. For example, the second sovereign region 208 may require that a particular validation is performed. As indicated above, the first access control unit 312 can receive a data from a source system via the secure pipeline from the source system 316. The first access control unit 312 can decode the data into a stream of bits. The first access control unit 312 can then identify the header from the stream of bits and determine the source address and the target address for the data. Based on the source system and the target system, one or more validation techniques may be required by the second sovereign region 208. Therefore, the data analysis unit 304 can use this information to determine a validation technique. The data analysis unit 304 can use other criteria to determine one or more validation techniques to be used for the data received by the target system.

The data analysis unit 304 can transmit information to the mapping unit 306 which can map the data or portions of the data to various validation processes. In particular, the mapping unit 306 can be in communication with a validation technique database 308, which can store one or more validation processes. The mapping unit 306 can receive information from the data analysis unit 304, and also from user based input. For example, a user may have previously used use the NOC to instruct the data valve 302 to perform specific validation processes. The mapping unit 306 can take information from each source and map the data or portions of the data to memory addresses for one or more instructions for performing validation processes stored in the validation technique database 308. The mapping unit 306 can further transmit the mapping to the validation unit 310. The validation unit 310 can use mapping to retrieve one or more instructions for performing the validation processes from the validation technique database 308, and validate the data. The validation technique database 308 and different validation techniques that the validation unit 310 can perform are described with more particularity with respect to FIG. 4. The validation unit 310 can perform one or more validation techniques on the data to determine whether the data can be received by a data center in the second sovereign region (e.g., second sovereign region 208). If the validation unit 310 validates the data, the, the validation unit 310 can transmit the data to the second access control unit 314. If, however, the validation unit 310 is unable to validate the data, then the validation unit 310 can either delete the data, quarantine the data, or perform a second attempt to validate the data.

The data valve 302 can further be gated from an external environment via the second access control unit 314. In some embodiments, the data valve 302 may only include the second access control unit 314 and may not include the first access control unit 312. In these embodiments, data that has been transmitted over the secure pipeline from source system 318 is received by the data analysis unit 304, rather than the first access control unit 312. Similar to the first access control unit 312, the second access control unit 314 can be implemented by a NIC. The second access control unit 314 can further include logic circuitry for determining whether to allow the data received via the second pipeline from source system 316 to be transmitted via the secure pipeline to target system 318. The logic circuitry can receive control instructions from the validation unit 310 along with the data to transmit the data via the secure pipeline to target system 318. The logic circuitry can also receive information user information (e.g., identity, permissions, authorization) from a permissions resolver. Based on the control instructions and the user information, the second access control unit 314 can transmit the data to the target system. In some embodiments, the secure pipeline to target system 318 can include optical fiber and the second access control unit 314 can include an optical transmitter. The optical transmitter can include a light source (e.g., laser) for generating light signals, a modulator for receiving electrical signals representing the data and encoding the data into the light signals, and an optical isolator for preventing light signals from secure pipeline to target system 318 from being transmitted back into the second access control unit 314. The secure pipeline to target system 318 can include an optical receiver unit for receiving the signal from the optical transmitter unit. Similar to the above described optical system of the first access control unit 312 can create a physical gap between the second access control unit 314 and the secure pipeline to target system that is traversed via the light signal. As the optical receiver at the secure pipeline to target system may not include a light source and the second access control unit 314 may not it include a photodiode, the communication may be in a single direction.

A user operating a NOC can communicate with the second access control unit 314 via a NOC interface 320. The user can determine whether to permit the data to be released from the data valve 302 based on the validation results. However, prior to executing a command permitting or denying release of the data from the data valve 302, the NOC can determine whether the user meets the requirements to make the determination. The NOC can access an identification associated with the user. For example, the NOC may be assigned to the user, the user may have inputted a user identifier or user password, or the NOC can use biometric data, such as facial features, to identify the user.

Figure 4:
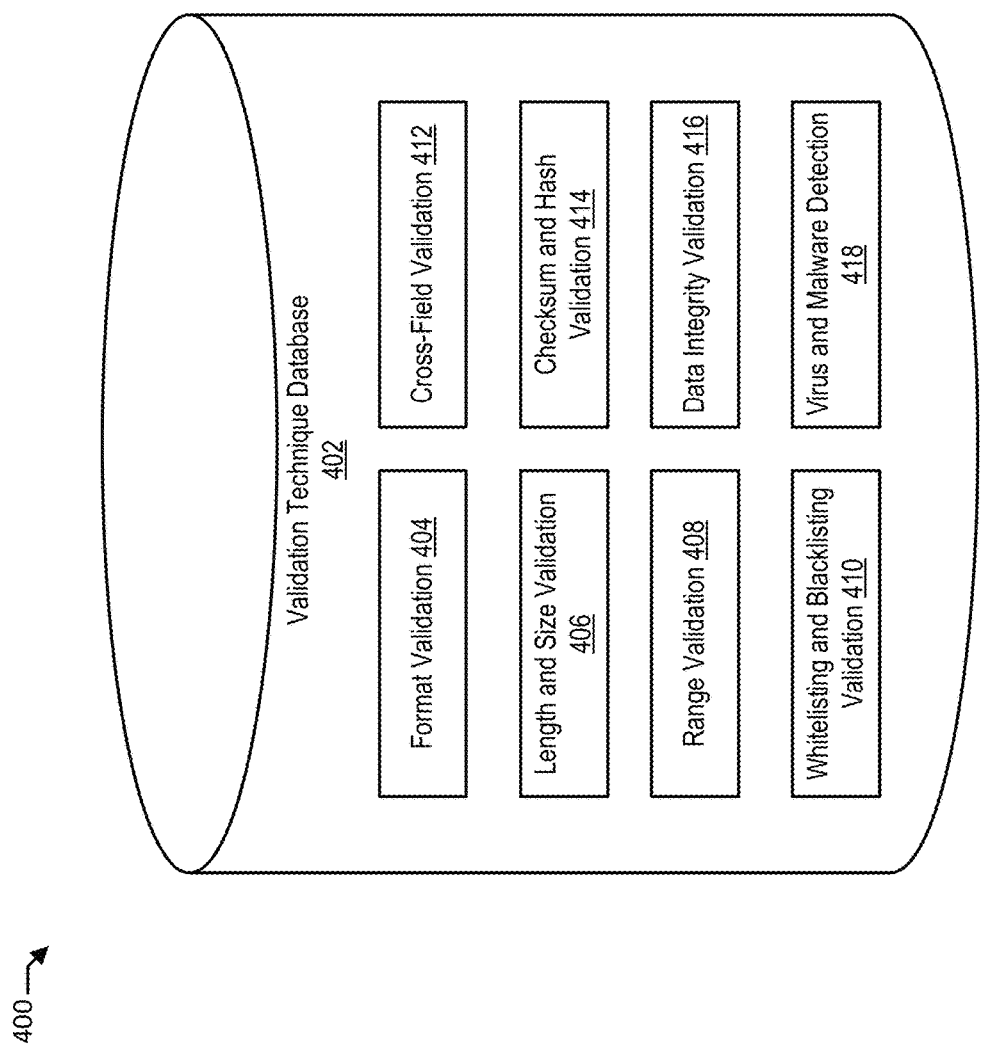
FIG. 4 is an illustration of an example validation technique database, according to one or more embodiments.

FIG. 4 is an illustration 400 of an example validation technique database, according to one or more embodiments. A data valve (e.g., data valve 302) can include a validation technique database 402 (e.g., validation technique database 308). A mapping unit (e.g., mapping unit 306) can access the validation technique database 402 to map validation techniques to instructions for performing the validation techniques. The validation technique database 402 can store one or more instructions for validation. The validation techniques to use can be determined by a data analysis unit (e.g., data analysis unit 304) that can use data received via a secure pipeline and the requirements of the jurisdiction second sovereign region within which the data valve is located. The validation technique database 402 can include instructions for various validation techniques. For example, the validation technique instructions can be for format validation 404, for determining whether the data or portions of the data comports to a particular format. For example, does data that includes a database of account numbers include values that are formatted as a particular account numbers. Values in one jurisdiction may be formatted differently than values in another jurisdiction. For example, in one jurisdiction dates can be formatted as month-day-year, whereas in another jurisdiction dates can be formatted as year-month-date. Therefore, the format validation 404 can determine whether the values are properly formatted for the jurisdiction receiving the data. Furthermore, if the values are not in a proper format, this can be an indication that the data is malicious data. The validation technique instructions can include length and size validation 406 for determining whether data strings in the data are a length less than a threshold length. If the strings are longer than the threshold hold, then there may be an indication that the malicious data has been added to the data. The validation technique instructions can include range validation 408 for determining whether numeric values fall within a threshold range of numeric values. If the data includes values that fall outside the threshold range of values, then there may be an indication that the numeric values have been tampered with. The validation technique instructions can include whitelisting and blacklisting validation. Whitelisting validation can include configuring the data valve with a list of approved source systems. For example, the data valve can be configured with the IP addresses or media access control (MAC) addresses of approved source systems. The IP address or MAC address can also be for source systems that are approved in a particular jurisdiction. The IP addresses or MAC addresses of the approved source systems can be compared to the IP address or MAC address of the source system. If the IP address or MAC address do not match, then there can be an indication that the data was sent from a malicious source. Blacklisting validation can include configuring the data valve with a list of unapproved source systems. For example, the data valve can be configured with the IP addresses or MAC addresses of unapproved source systems. The IP address or MAC address can also be for source systems that are unapproved in a particular jurisdiction. The IP addresses or MAC addresses of the approved source systems can be compared to the IP address or MAC address of the source system. If the IP address or MAC address match, then there can be an indication that the data was sent from a malicious source.

The validation technique instructions can include cross-field validation 412, for determining whether the relationship between data fields is logical. For example, if a first field and a second are to include consecutive data ranges, cross-field validation can be used to determine whether the ending date of the first field occurs prior to the beginning date of the second field. If the relationships between the fields are illogical (e.g., the ending date of the first field occurs after to the beginning date of the second field, then there can be an indication that the malicious data has been introduced into the data. The validation technique instructions can include checksum and hash validation 414. The validation unit can determine a checksum or a hash for the data and compare the checksum or hash with a checksum or hash received with the data. Some jurisdictions may require that checksum and hash validation 414 is performed for particular types of data. Therefore, in these jurisdictions, if the checksum or hash do not match that the data may not pass through a second access control unit (e.g., second access control unit 314). The validation technique instructions can include a data integrity validation 416. Data integrity validation 416 can include determining whether correct number of tables in includes in the data, whether each table has the correct number columns and rows. In some instances, the data may include instructions for assembling a data structure, such as a table. The data valve can assemble the data structure and determine that no malicious code is included. The validation technique instructions can include a virus and malware detection 418, in which virus detection and malware detection software is run against the data to determine whether any virus or malware is included in the data.

It should be appreciated that FIG. 4 illustrates an example set of validation techniques and other embodiments can include a different set of validation techniques. A validation unit (e.g., validation unit 310) can perform one or more of the validation techniques included in the validation technique database 402. The validation unit 310 can further include logic circuitry for determining whether to permit the data to pass if it is determined that the data is invalid based on or more of the validation techniques. The validation techniques provide the validation unit 310 with information for determining whether data can be released from the data valve and into a data center in a sovereign jurisdiction.

Figure 5:
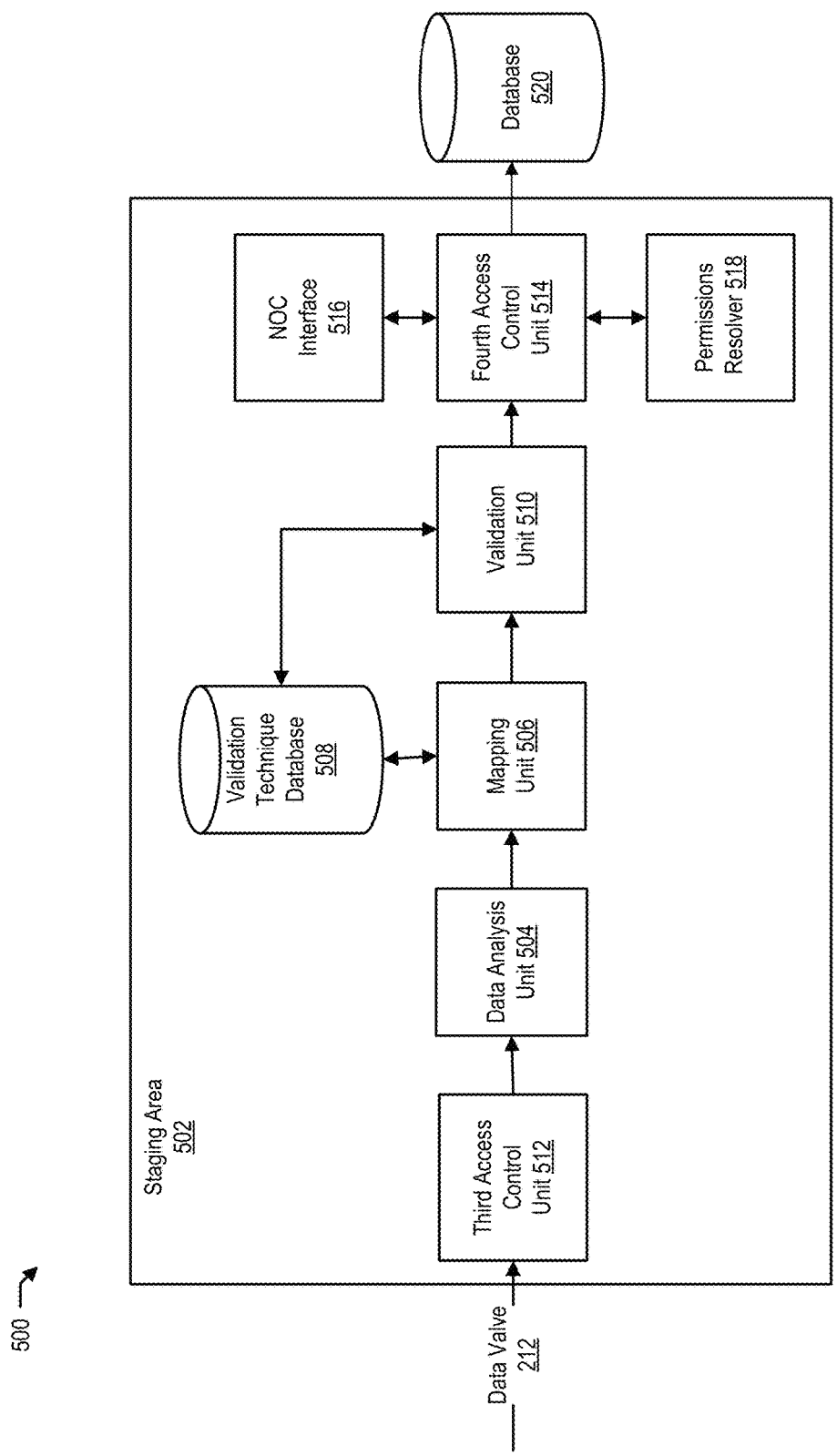
FIG. 5 is an illustration of an example staging area, according to one or more embodiments.

FIG. 5 is an illustration 500 of an example staging area, according to one or more embodiments. The staging area 502 can be located at a data center (second data center 204) that is receiving data in a sovereign region (e.g., second sovereign region 208) that is different than the sovereign region (first sovereign region 206) of a data center (e.g., first data center 202) that is transmitting the data. It should be appreciated that in some embodiments a data validation system may only include a data valve, in other embodiments a data validation system may only include a staging area, and in yet other embodiments, the data validation system may include a data valve and a staging area. The staging area 502 can function similarly to a data valve (e.g., data valve 302) and include a data analysis unit 504, a mapping unit 506, a validation technique database 508, and a validation unit 510. The staging area 502 can be gated from an external environment via a third access control unit 512 and a fourth access control unit 514. The third access control unit 512 can include a combination of software and hardware configured to manage data to and from the data valve 302. The third access control unit 512 can permit data transmitted over a secure pipeline (e.g., over a secure pipeline 210 and from the data valve 212) to pass through into the staging area 502.

The third access control unit 512 can regulate the flow of data, such that data can pass through into the staging area 502. For example, the third access control unit 512 can be implemented by a NIC that is configured to receive data via a secure pipeline from source system 316, and further to not allow data to be transmitted back to the secure pipeline. In other embodiments, the third access control unit 512 can include optical circuitry that is configured to receive an optical signal from a source. In these embodiments, the third access control unit 512 can include an optical receiver that includes a photodiode for receiving the optical signal via the optical fibers and converting the optical signal into an electrical signal. The third access control unit 312 can further include a convertor circuit for receiving the electrical signal from the photodetector and converting the current into a voltage signal. The third access control unit 512 can further include a filter for receiving the voltage signal and filtering out and noise. The third access control unit 512 can further include a driver for processing the signal to be amenable to downstream processing. The third access control unit 512 can further prevent an external source from accessing data stored in the staging area 502 similar to the first access control unit 312.

The data that passes through the third access control unit 512 can be received by the data analysis unit 504, which can include software for analyzing the data to gather information to be used for validation purposes. The data analysis unit 504 can perform various functions such as gather information for providing visualization of the data, statistical analysis of the data, mining the data for patterns, and performing predictive analytics. The information can be used by the data analysis unit 504 for determining one or more validation processes to perform on the data. The data analysis unit 504 can gather information to provide a visualization (e.g., a histogram of data types, a graph of data relationships, a chart of metadata describing the data) to the user on the NOC. The data analysis unit 504 can use the information to determine whether to permit the data to one or more validation processes to perform on the data.

The data analysis unit 504 can perform a statistical analysis of the data such as descriptive statistics and inferential statistics. The statistics can be used by the data analysis unit 504 to determine pattern in the data. In some instances, the patterns can be indicative of data that is under a special class in the second sovereign region. Furthermore, it may be prohibited in the second sovereign region to receive this special class of data, such as data with the two types of data that are mixed. The statistical analysis can be used by the data analysis unit 504 to select one or more validation processes to perform on the data.

The data analysis unit 504 can further perform data mining to extract and discover patterns and relationships in the data. The data analysis unit 504 can be configured to discover patterns and relationships that are relevant to the second sovereign region. The data analysis unit 504 can further use predictive modeling to generative predictive analytics. For example, the data analysis unit 504 can make predictions as to an outcome of a data transformation process included in the data. The patterns and the relationships can further provide information that can be used by the data analysis unit 504 to select the one or more validation processes.

The data analysis unit 504 can use the information obtained from analyzing the data to determine a particular validation process to be used to validate the data received from the source system. The data analysis unit 504 can use various criteria to determine which validation technique(s) to use. The data analysis unit 504 can base the decision on the types of data. The data analysis unit 504 can determine a validation technique based on the regulations of the jurisdiction. For example, the second sovereign region may require that a particular validation is performed. Therefore, the data analysis unit 504 can use this information to determine a validation technique. The data analysis unit 504 can use other criteria to determine one or more validation techniques to be used for the data received by the target system.

The data analysis unit 504 can transmit information to the mapping unit 506 which can map the data or portions of the data to various validation processes. In particular, the mapping unit 506 can be in communication with a validation technique database 508, which can store one or more validation processes. The validation technique database 508 of the staging area 502 can be different than the validation technique database 308 of the data valve 302. The mapping unit 506 can receive information from the data analysis unit 504, and also from user based input. For example, a user may have previously used use the NOC, via a NOC interface 516 to instruct the staging area 502 to perform specific validation processes. The mapping unit 306 can take information from each source and map the data or portions of the data to memory addresses for one or more instructions for performing validation processes stored in the validation technique database 508. The mapping unit 506 can further transmit the mapping to the validation unit 510, which can use mapping to retrieve one or more instructions for performing the validation processes from the validation technique database 508, and validate the data. The validation technique database 508 can store code for performing different validation techniques. The validation unit 510 can perform one or more validation techniques on the data to determine whether the data can be received by a data center in the second sovereign region 208. If the validation unit 510 validates the data, the validation unit 510 can transmit the data to the fourth access control unit 514. If, however, the validation unit 510 is unable to validate the data, then the validation unit 510 can either delete the data, quarantine the data, or perform a second attempt to validate the data.

In some embodiments, the staging area 502 may only include the fourth access control unit 514 and may not include the third access control unit 512. In these embodiments, data that has been transmitted is received by the data analysis unit 504, rather than the third access control unit 512. The fourth access control unit 514 can further include logic circuitry for determining whether to allow the data received to be transmitted via the secure pipeline to target system.

A user operating a NOC can communicate with the fourth access control unit 514 via a NOC interface 516. The user can determine whether to permit the data to be released from the staging area 502 based on the validation results. However, prior to executing a command permitting or denying release of the data from the staging area 502, the NOC can determine whether the user meets the requirements to make the determination. The NOC can access an identification associated with the user. For example, the NOC may be assigned to the user, the user may have inputted a user identifier or user password, or the NOC can use biometric data, such as facial features, to identify the user. The NOC can transmit the user's identity to the permissions resolver 518.

The permission resolver 518 can include software for applying a set of rules and determining whether the user meets the requirements to make the determination. The requirements can include whether the user is currently an employee of the CSP, whether the user has a permission level to make the determination whether to permit or deny the release of data from the staging area 502, whether the user is a resident of the second sovereign region whether the user is currently located in the second sovereign region.

The permissions resolver 518 can access a second human resources system (e.g., second human resources system 216) for the second sovereign region. The second human resources system can include employee information for employees working in the second sovereign region.

The permissions resolver 518 can transmit the employee identifier to the second human resources system 216 along with instructions to verify that the user currently works for the CSP, a permission level of the user, and a residency of the user. The second human resources system 216 can access an employee database and access the user's file based on the received employee identifier. The second human resources system can further determine whether the user is currently an employee of the CSP and is assigned to the second data center.

In some embodiments, the second human resources system can further access the global human resources system (e.g., the first human resource system 218) and reverify that the user currently works for the CSP, is assigned to the second data center and is a resident of the second sovereign region. In some instances, it may be possible that the global human resources system has been updated with changes to the user's employment status, location assignment, and residency; and the global human resources system has not pushed out updates to a local human resources system (e.g., second human resources system 216).

The second human resources system can further determine whether the user has permission to determine whether to allow data to pass through the staging area 502. The second human resources system can further access a second permissions service (e.g., second permission service 220), that is configured to manage employee access rights to prevent employees from engaging in unauthorized activities on the CSP's computing systems. The second permissions service can include information for managing roles, permissions, and access control rules for employees assigned to the second data center. The permissions can include whether the use can permit or deny the data to be released from the staging area 502.

The second human resources system can transmit message to the second permissions service providing an identity of the user and a request for information as to whether the user has permission to determine whether to permit the data to be released from the staging area 502. In response to receiving the identity and the request, the second permissions service can determine whether the user has the requisite permission. Based on the information, the fourth access control unit 514 can permit the data to pass through the staging area. In some embodiments the data is stored in a database 520 at the second data center.

Figure 6:
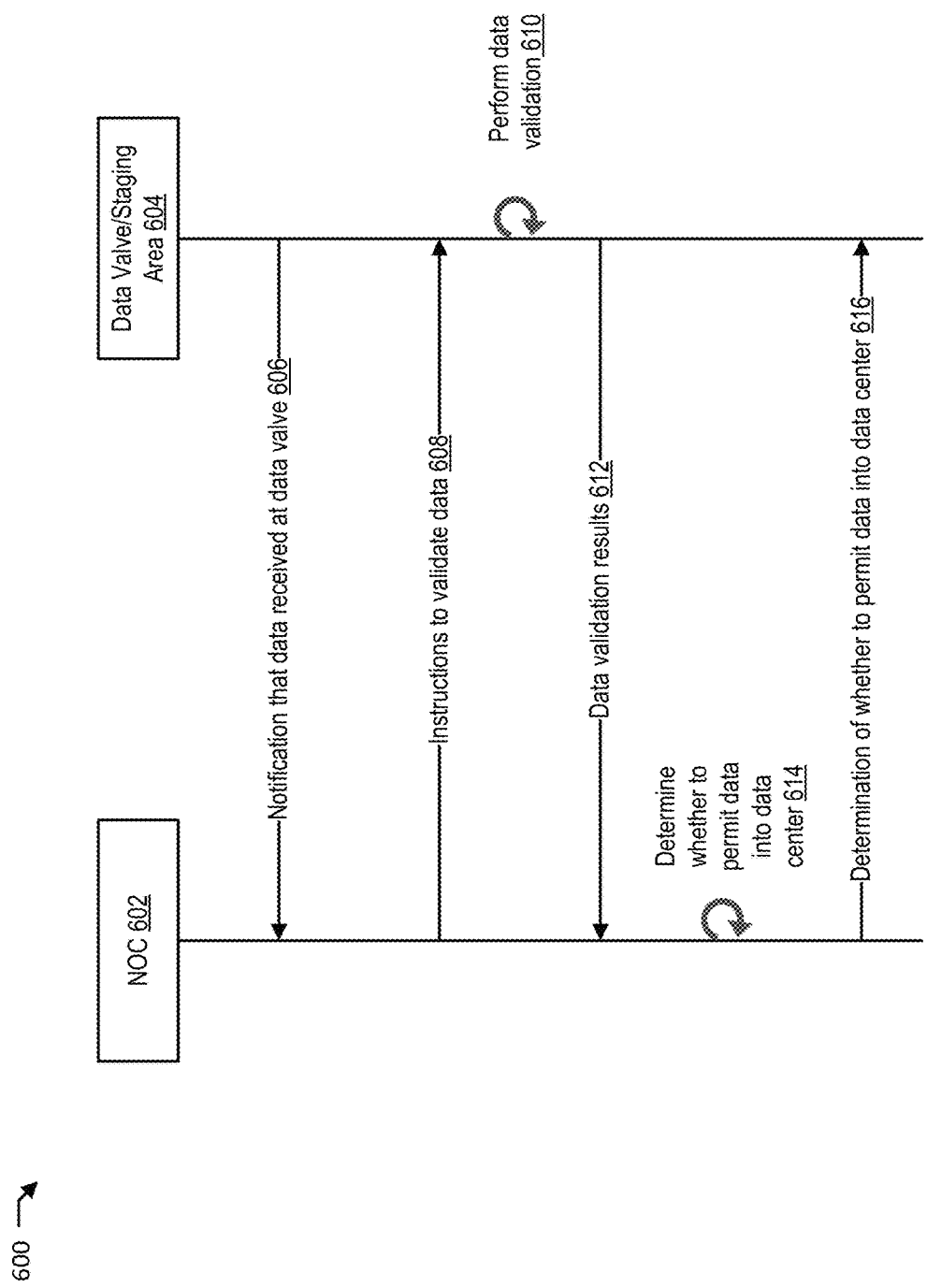
FIG. 6 is a signaling diagram of an example process for data validation, according to one or more embodiments.

FIG. 6 is a signaling diagram of an example process 600 for data validation, according to one or more embodiments. As illustrated, a NOC 602 can be in communication with a data valve or stage area 604. For the purpose of brevity, a data valve can include a data valve (e.g., data valve 302 or a staging area 502). While the operations of process 600 is described as being performed by generic computers, it should be understood that any suitable device may be used to perform one or more operations of this method. Process 600 (described below) is illustrated as signaling diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At 606, the data valve 604 can transmit a message indicating that a data has been received. For example, the data can be received via a secure pipeline (e.g., secure pipeline 210) from a first data center (e.g., first data center 202) locating in a first sovereign region (e.g., first sovereign region 206). The NOC 602 can be located in a second sovereign region (e.g., second sovereign region 208) and be associated with a second data center (e.g., second data center 204).

At 608, the NOC 602 can generate a message indicating that the data valve 604 is to validate the data. The NOC 602 can generate the message to include specific validation techniques to use for data validation. The NOC 602 can further transmit the message to the data valve 604.

At 610, the data valve 604 can validate the data. For example, the data valve 604 can include a validation unit (e.g., validation unit 310, validation unit 510). The validation unit can access a validation technique database and use code for performing one or more validation techniques on the data. At 612, the data valve 604 can generate a message indicating the validation results. The data valve 604 can further transmit the message to the NOC 602.

At 614, the NOC 602 can use the results from the validation unit to determine whether to the data into the second data center. In some embodiments, any decision made using the NOC can be further verified to determine whether a NOC user is authorized to make the decision. For example, in response to receiving the determination from the validation unit, the NOC can transmit a message to a permissions resolver to determine whether the NOC's user has permission to make the determination. The permission resolver can access a human resources system to determine the user's permissions. If the permissions resolver determines that the user is authorized, the permissions resolver can transmit instructions to a control access unit to permit the data to pass through the data valve.

A 616, the NOC 602 can transmit a message to the data valve 604 indicating whether to allow the data to pass through the data valve 604. If the message indicates that the data is to pass through and the permissions resolver indicates that the user is authorized to make the determination, the data valve 604 can let the data to pass through. If the message indicates that the data is to pass through and the permissions resolver indicates that the user is not authorized to make the determination, the data valve 604 may not let the data to pass through. If the message indicates that the data is not to pass through and the permissions resolver indicates that the user is authorized to make the determination, the data valve 604 may not let the data to pass through. If the message indicates that the data is not to pass through and the permissions resolver indicates that the user is not authorized to make the determination, the data valve 604 may not let the data to pass through.

FIG. 7 is an example process flow 700 for data validation, according to one or more embodiments. At 702, the computer-implemented method can include a computing system of a first data center (e.g., second data center 204) in a first region (e.g., second sovereign region 208) processing a first message indicating that an intermediate computing system (e.g., data valve 212) managed by the first data center has received data from a second data center (e.g., first data center 202) in a second region (e.g., first sovereign region 206). The computing system can be data center mainframe or a NOC, where the NOC is in communication with the main frame. The data stored in an isolated environment of the intermediate computing system. For example, the intermediate computing system can include a first access control unit (e.g., first access control unit 312) and a second access control unit (e.g., second access control unit 314) that can be configured to prevent data from entering or leaving the isolated environment. In some embodiments, the computing system can include computing devices distributed across various different locations.

At 704, the computer-implemented method can include the computing system transmitting first control instructions to the intermediate computing system to validate the data based on a first criteria. The intermediate computing system can include a validation unit (e.g., validation unit 310) that can use various validation techniques to validate the data. The validation techniques can be selected based on the requirements of the first region.

At 706, the computer-implemented method can include the computing system, processing validation results from the intermediate computing system. The validation unit can process the results of the validation to determine whether or not to validate the data.

At 708, the computer-implemented method can include computing system processing a second message indicating to release the data from the isolated environment of the intermediate computing system. The computing system can be a NOC or in communication with a NOC. A NOC user can analyze the validation results and determine whether to release the data from the intermediate computing system. The computing system can determine whether the NOC user is authorized to make the determination and is located in the first region. For example, the computing system can transmit a request to a local human resources system to determine whether the user has authorization. The computing system can also use a location technique to determine whether the NOC is located at the first region. If the NOC is located in the first region, it can be assumed that the user is in the first region.

At 710, the computer-implemented method can include the computing system processing a third message indicating that the second message originated from a computing device located in the first region. If at 708, it is assumed that the user is in the first region, it can be assumed that the second message originated from the first region.

At 712, the computer-implemented method can include the computing system causing the data to be released from the isolated environment, based at least in part on the validation results, the indication to release the data, and the indication that the second message originated in the first region. The data can be either released into a data center data base or into another isolated environment.

Figure 8:
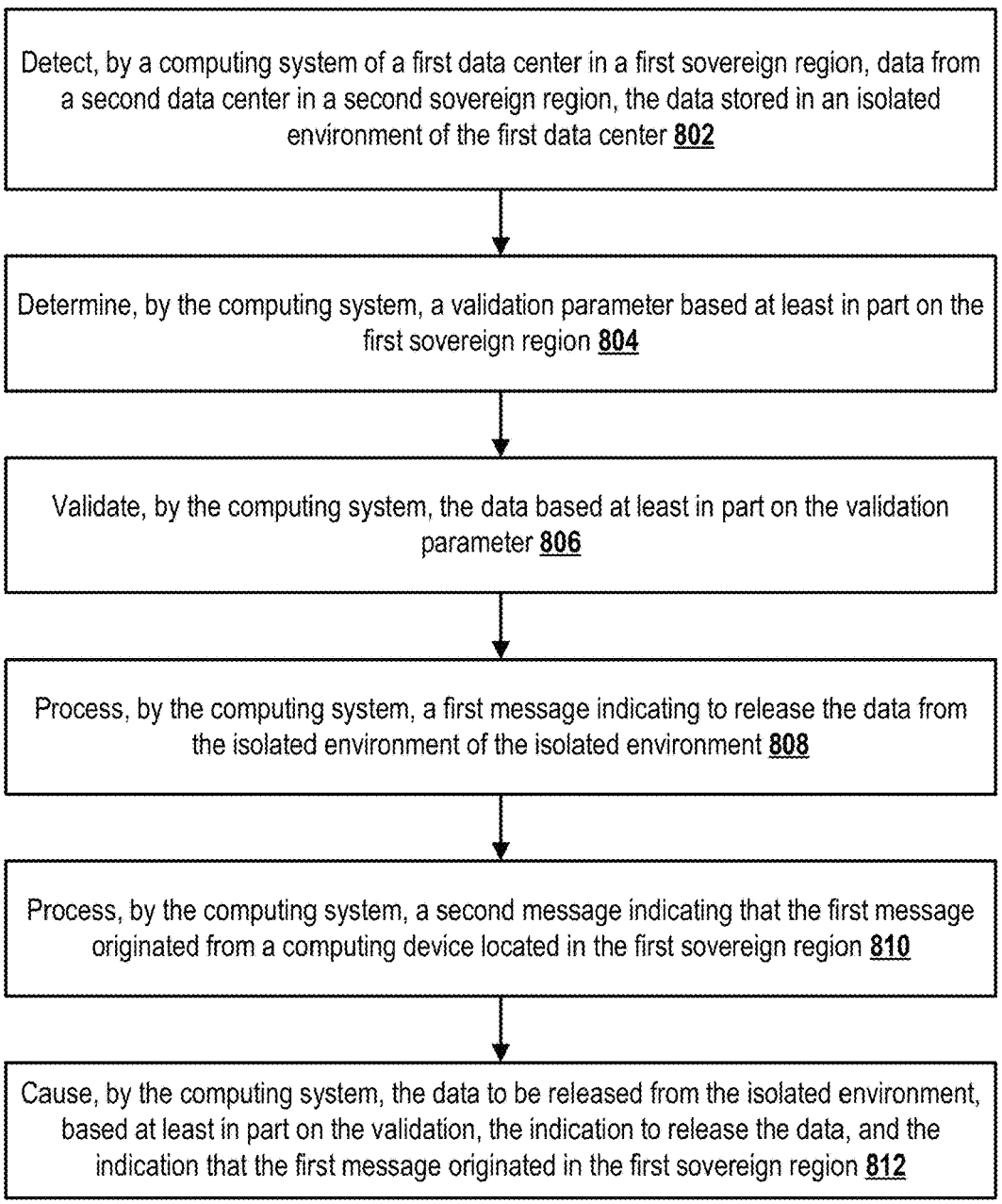
FIG. 8 is an example process flow for data validation, according to one or more embodiments.

FIG. 8 is an example process flow 800 for data validation, according to one or more embodiments. At 802, the computer-implemented method can include a computing system of a first data center (e.g., second data center 204) in a first region (e.g., second sovereign region 208) detecting data from a second data center (e.g., first data center 202) in a second region (e.g., first sovereign region 206). The data can be stored in an isolated environment (e.g., staging area 226) of the first data center. The computing system can be data center mainframe or a NOC, where the NOC is in communication with the main frame. The data stored in an isolated environment of the intermediate computing system. For example, the intermediate computing system can include a first access control unit (e.g., third access control unit 512) and a second access control unit (e.g., fourth access control unit 514) that can be configured to prevent data from entering or leaving the isolated environment. In some embodiments, the computing system can include computing devices distributed across various different locations.

At 804, the computer-implemented method can include determining, by the computing system, a validation parameter based at least in part on the first region. The first region may have one or more requirements for data to be stored in the region. Furthermore, different validation techniques can be used for different requirements. Therefore, the computing system can select a validation technique that can be used to determine whether a requirement has been met.

At 806, the computer-implemented method can include the computing system validating the data based at least in part on the validation parameter. The isolated environment can include a validation unit (e.g., validation unit 510) that can use various validation techniques to validate the data. The validation techniques can be selected based on the requirements of the first region.

At 808, the computer-implemented method can include the computing system processing a first message indicating to release the data from the isolated environment of the isolated environment. The computing system can be a NOC or in communication with a NOC. A NOC user can analyze the validation results and determine whether to release the data from the intermediate computing system. The computing system can determine whether the NOC user is authorized to make the determination and is located in the first region. For example, the computing system can transmit a request to a local human resources system to determine whether the user has authorization. The computing system can also use a location technique to determine whether the NOC is located at the first region. If the NOC is located in the first region, it can be assumed that the user is in the first region.

At 810, the computer-implemented can include the computing system processing a second message indicating that the first message originated from a computing device located in the first region. If at 808, it is assumed that the user is in the first region, it can be assumed that the second message originated from the first region.

At 812, the computer-implemented method can include the computing system causing the data to be released from the isolated environment, based at least in part on the validation, the first message to release the data, and the second message that the first message originated in the first region. The data can be either released into a data center data base.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
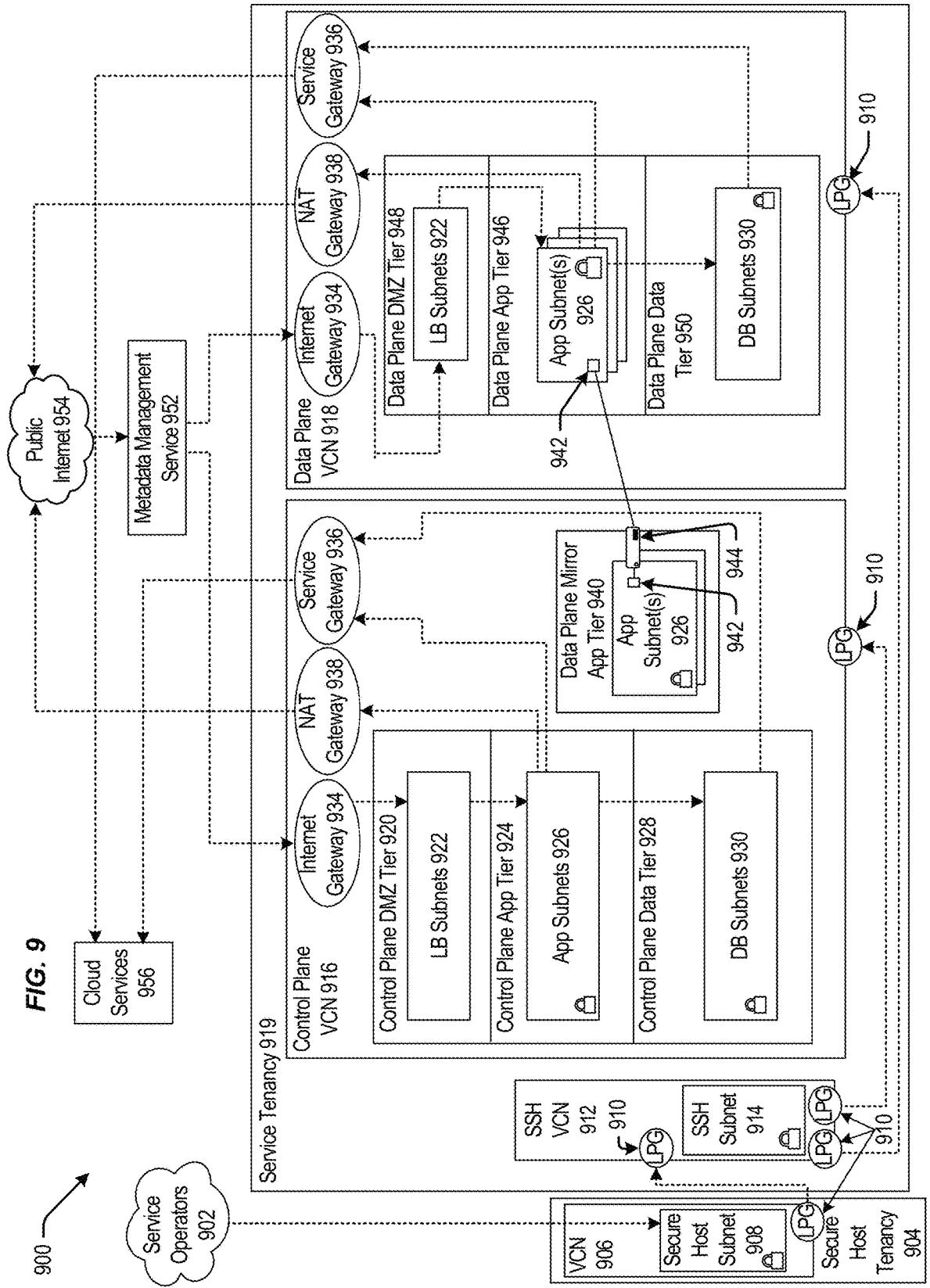
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively coupled to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Metadata that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
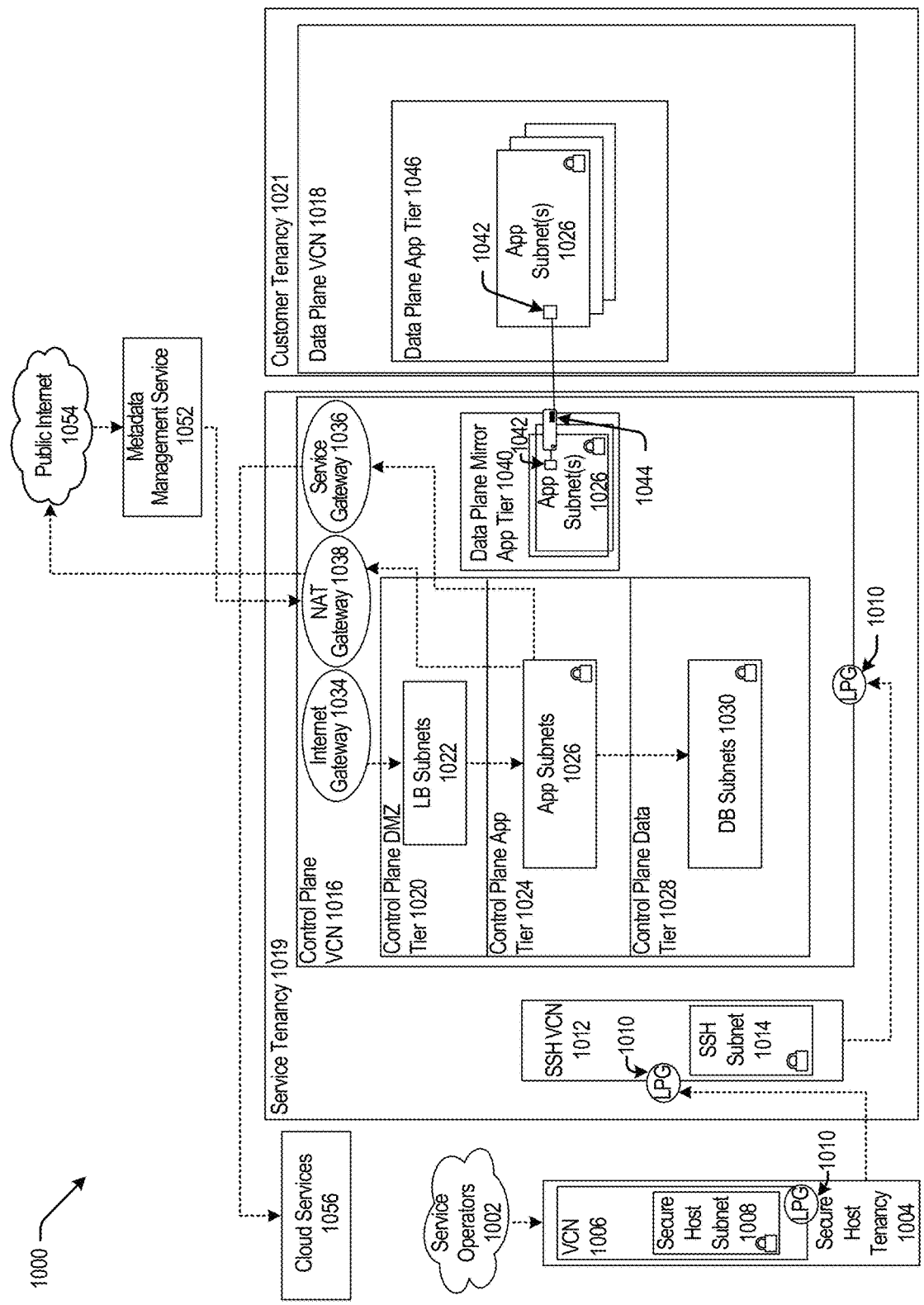
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 936 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively coupled to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service 1056 "Deployment 9," may be located in "Region 1" and in "Region 2." If a call to "Deployment 9" is made by the service gateway 1036 contained in the control plane VCN 1016 located in "Region 1", the call may be transmitted to Deployment 9 in "Region 1". In this example, the control plane VCN 1016, or "Deployment 9" in "Region 1", may not be communicatively coupled to, or otherwise in communication with, "Deployment 9" in "Region 2".

Figure 11:
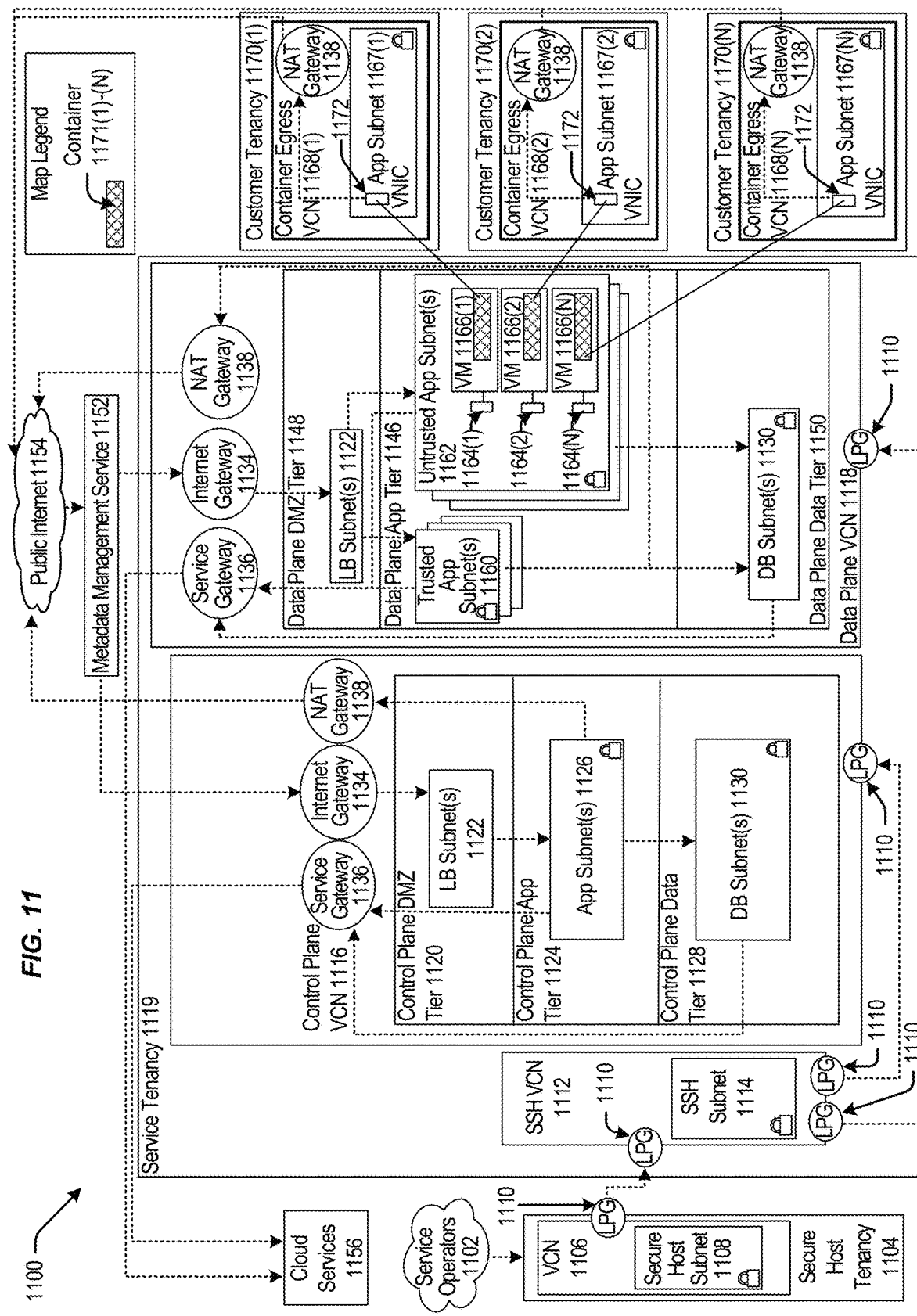
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management service 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively coupled to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
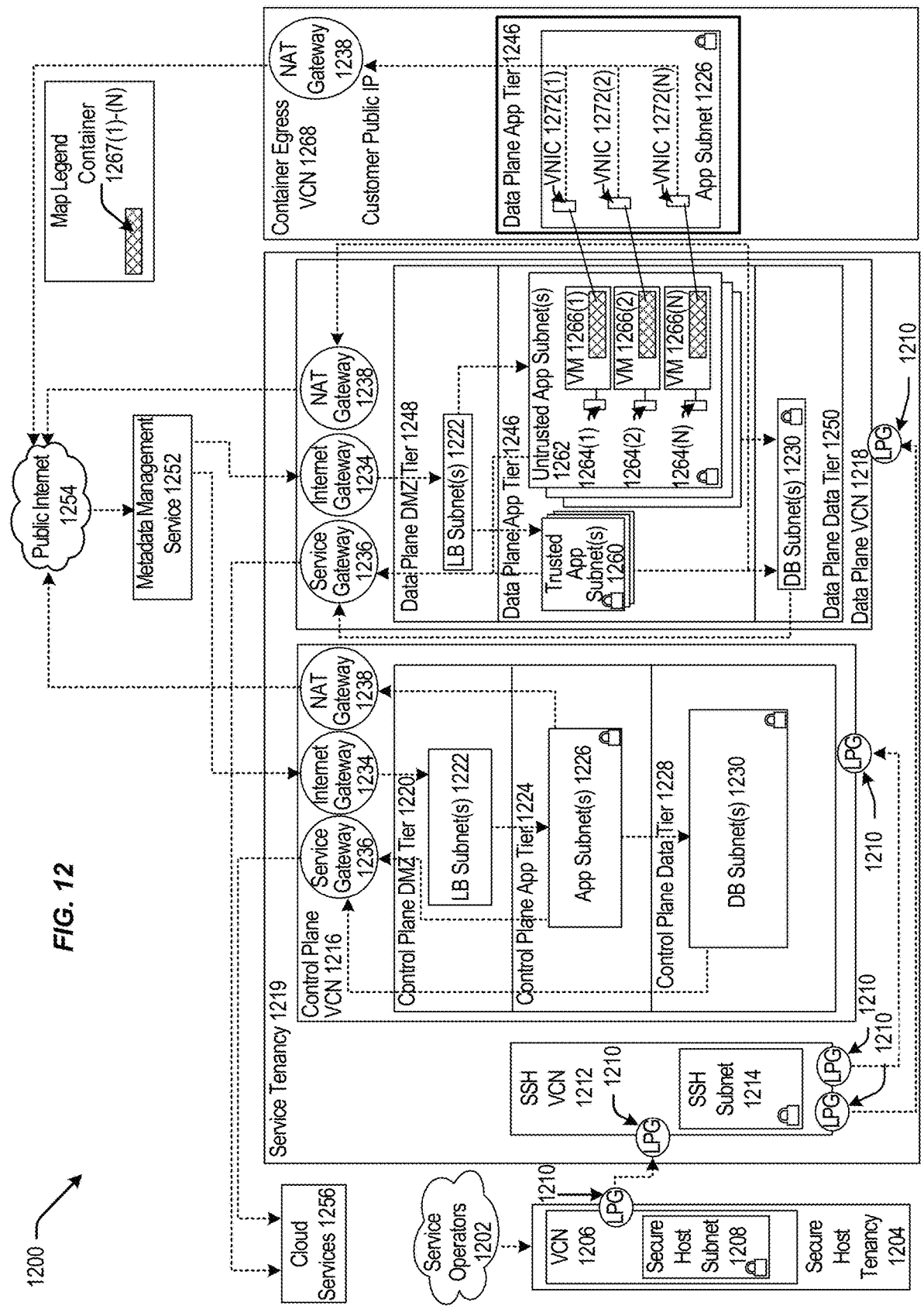
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management service 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively coupled to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
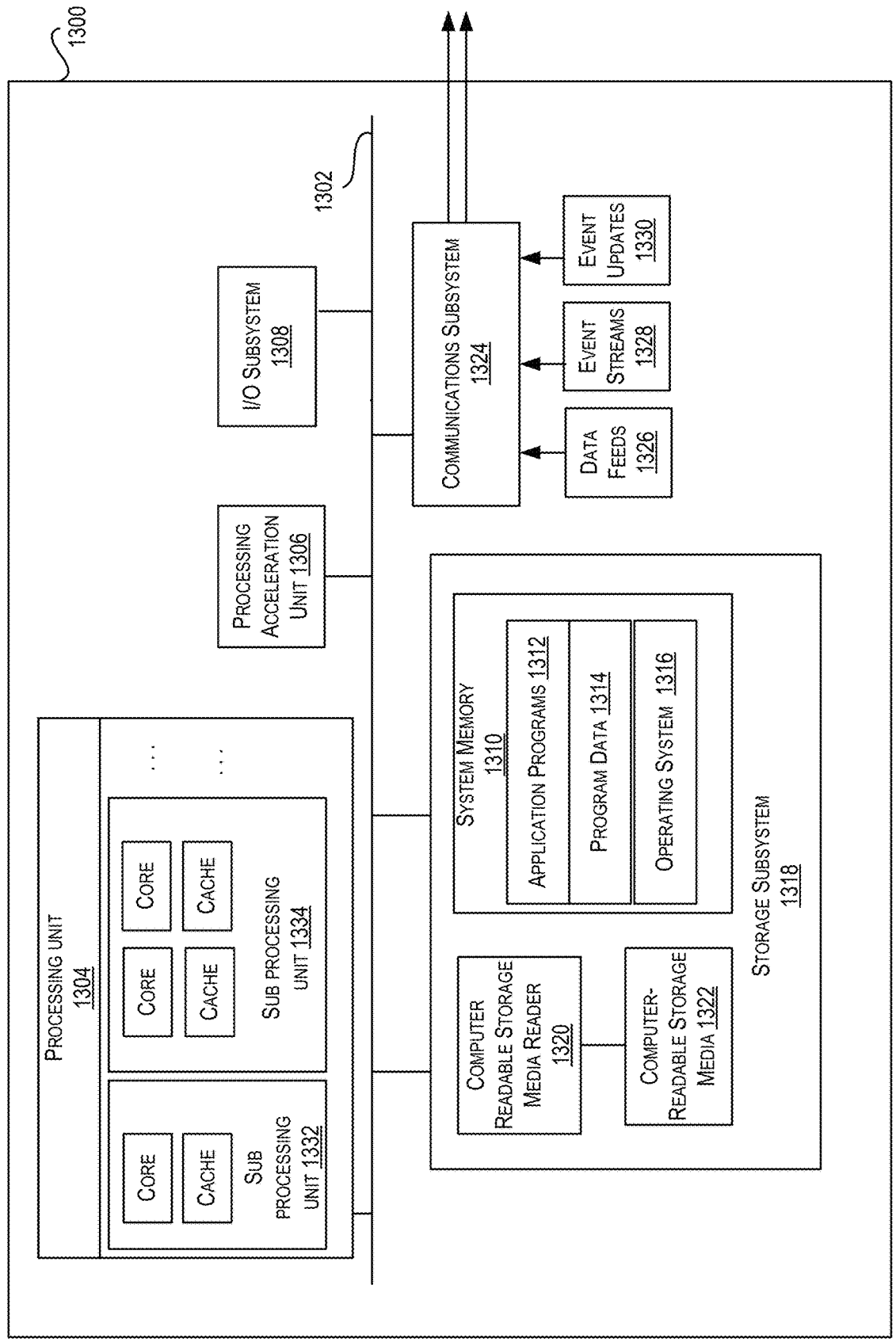
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1304 provide the functionality described above. Storage subsystem 1318 may also provide a repository for storing data used in accordance with the present disclosure.

As depicted in the example in FIG. 13, storage subsystem 1318 can include various components including a system memory 1310, computer-readable storage media 1322, and a computer readable storage media reader 1320. System memory 1310 may store program instructions that are loadable and executable by processing unit 1304. System memory 1310 may also store data that is used during the execution of the instructions and/or data that is generated during the execution of the program instructions. Various different kinds of programs may be loaded into system memory 1310 including but not limited to client applications, Web browsers, mid-tier applications, relational database management systems (RDBMS), virtual machines, containers, etc.

System memory 1310 may also store an operating system 1316. Examples of operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1300 executes one or more virtual machines, the virtual machines along with their guest operating systems (GOSs) may be loaded into system memory 1310 and executed by one or more processors or cores of processing unit 1304.

System memory 1310 can come in different configurations depending upon the type of computer system 1300. For example, system memory 1310 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1310 may include a basic input/output system (BIOS) containing basic routines that help to transfer information between elements within computer system 1300, such as during start-up.

Computer-readable storage media 1322 may represent remote, local, fixed, and/or removable storage devices plus storage media for temporarily and/or more permanently containing, storing, computer-readable information for use by computer system 1300 including instructions executable by processing unit 1304 of computer system 1300.

Computer-readable storage media 1322 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Machine-readable instructions executable by one or more processors or cores of processing unit 1304 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   processing, by a computing system of a first data center in a first region, a first message indicating that an intermediate computing system managed by the first data center has received data from a second data center in a second region, the data stored in an isolated environment of the intermediate computing system;
   transmitting, by the computing system, first control instructions to the intermediate computing system to validate the data based at least in part on a first criteria;
   processing, by the computing system, validation results from the intermediate computing system;
   processing, by the computing system, a second message indicating to release the data from the isolated environment of the intermediate computing system;
   processing, by the computing system, a third message indicating that the second message originated from a computing device located in the first region; and
   causing, by the computing system, the data to be released from the isolated environment based at least in part on the validation results, the second message, and the third message.

2. The computer-implemented method of claim 1, wherein the intermediate computing system is located in the first region.

3. The computer-implemented method of claim 1, wherein transmitting the first control instructions to the intermediate computing system to validate the data based at least in part on a first criteria comprises:
   selecting a validation technique to be used to validate the data based at least in part on the first region, wherein the first control instructions comprise an indication of the validation technique.

4. The computer-implemented method of claim 1, wherein the isolated environment is a first isolated environment, and wherein causing the data from the isolated environment to be released based at least in part on the validation results, the indication to release the data, and the indication that the second message originated in the first region comprises:
   causing the data to be released from the first isolated environment to a second isolated environment at the first data center.

5. The computer-implemented method of claim 1, wherein causing the data from the isolated environment to be released based at least in part on the validation results, the indication to release the data, and the indication that the second message originated in the first region comprises:
   causing the data to be released from the isolated environment to a database of the first data center.

6. The computer-implemented method of claim 1, wherein the method further comprises:
   causing the data to be inaccessible to the first data center and the second data center during a validation process.

7. The computer-implemented method of claim 1, wherein the method further comprises:
   transmitting, to a human resources system in the second region, a request to determine authorization to transmit the second message, wherein the data is released from the isolated environment is based at least in part on the authorization.

8. The computer-implemented method of claim 1, wherein the isolated environment is a first isolated environment, and wherein causing the data from the isolated environment to be released based at least in part on the validation results, the indication to release the data, and the indication that the second message originated in the first region comprises:
   causing the data to be released from the first isolated environment to a second isolated environment at the first data center.

9. The computer-implemented method of claim 1, wherein causing the data from the isolated environment to be released based at least in part on the validation results, the indication to release the data, and the indication that the second message originated in the first region comprises:
   causing the data to be released from the isolated environment to a database of the first data center.

10. The computer-implemented method of claim 1, wherein the set of instructions, when executed by the one or more processors, further cause the one or more processors to:
    cause the data to be inaccessible to the first data center and the second data center during a validation process.

11. A computing system of a first data center in a first region, the computing system comprising:
    one or more processors; and
    one or more computer-readable media having stored thereon a set of instructions that, when executed by the one or more processors, cause the one or more processors to:
      process a first message indicating that an intermediate computing system managed by the first data center has received data from a second data center in a second region, the data stored in an isolated environment of the intermediate computing system;
      transmit first control instructions to the intermediate computing system to validate the data based at least in part on a first criteria;
      process validation results from the intermediate computing system;
      process a second message indicating to release the data from the isolated environment of the intermediate computing system;
      process a third message indicating that the second message originated from a computing device located in the first region; and
      cause the data to be released from the isolated environment based at least in part on the validation results, the second message, and the third message.

12. The computing system of claim 11, wherein the intermediate computing system is located in the first region.

13. The computing system of claim 11, wherein transmitting the first control instructions to the intermediate computing system to validate the data based at least in part on a first criteria comprises:

selecting a validation technique to be used to validate the data based at least in part on the first region, wherein the first control instructions comprise an indication of the technique.

14. The computing system of claim 11, wherein the isolated environment is a first isolated environment, and wherein causing the data from the isolated environment to be released based at least in part on the validation results, the indication to release the data, and the indication that the second message originated in the first region comprises:
causing the data to be released from the first isolated environment to a second isolated environment at the first data center.

15. The computing system of claim 11, wherein causing the data from the isolated environment to be released based at least in part on the validation results, the indication to release the data, and the indication that the second message originated in the first region comprises:
causing the data to be released from the isolated environment to a database of the first data center.

16. The computing system of claim 11, wherein the set of instructions, when executed by the one or more processors, further cause the one or more processors to:
cause the data to be inaccessible to the first data center and the second data center during a validation process.

17. The computing system of claim 11, wherein the set of instructions, when executed by the one or more processors, further cause the one or more processors to:
transmit, to a human resources system in the second region, a request to determine authorization to transmit the second message, wherein the data is released from the isolated environment is based at least in part on the authorization.

18. One or more non-transitory computer-readable media having stored thereon a set of instructions that, when executed by one or more processors of a computing system, cause the one or more processors to:
process a first message indicating that an intermediate computing system managed by a first data center has received data from a second data center in a second region, the data stored in an isolated environment of the intermediate computing system, and the computing system being of the first data center and in a first region;
transmit first control instructions to the intermediate computing system to validate the data based at least in part on a first criteria;
process validation results from the intermediate computing system;
process a second message indicating to release the data from the isolated environment of the intermediate computing system;
process a third message indicating that the second message originated from a computing device located in the first region; and
cause the data to be released from the isolated environment based at least in part on the validation results, the second message, and the third message.

19. The one or more non-transitory computer-readable media of claim 18, wherein the intermediate computing system is located in the first region.

20. The one or more non-transitory computer-readable media of claim 18, wherein transmitting the first control instructions to the intermediate computing system to validate the data based at least in part on a first criteria comprises:
selecting a validation technique to be used to validate the data based at least in part on the first region, wherein the first control instructions comprise an indication of the technique.

* * * * *